US012289687B2

(12) United States Patent
Abotabl et al.

(10) Patent No.: US 12,289,687 B2
(45) Date of Patent: Apr. 29, 2025

(54) DOWNLINK TRANSMIT POWER CONTROL GROUP COMMON DCI

(71) Applicant: QUALCOMM Incorporated, San Diego, CA (US)

(72) Inventors: Ahmed Attia Abotabl, San Diego, CA (US); Hung Dinh Ly, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/869,543

(22) Filed: Jul. 20, 2022

(65) Prior Publication Data
US 2024/0031937 A1 Jan. 25, 2024

(51) Int. Cl.
H04W 52/14 (2009.01)
H04L 5/00 (2006.01)
H04W 24/08 (2009.01)

(52) U.S. Cl.
CPC ......... *H04W 52/143* (2013.01); *H04L 5/0051* (2013.01); *H04W 24/08* (2013.01)

(58) Field of Classification Search
CPC . H04W 52/143; H04W 24/08; H04W 52/325; H04L 5/0051
See application file for complete search history.

(56) References Cited

U.S. PATENT DOCUMENTS 11,191,071 B2 * 11/2021 Yi ..................... H04W 72/23
11,582,697 B2 *  2/2023 Zhou ................. H04W 52/04
12,035,249 B2 *  7/2024 Zhou ................. H04W 52/16
2020/0383061 A1 * 12/2020 Yang ................. H04W 52/50
2021/0400591 A1 * 12/2021 Zhou ................. H04W 52/44
2022/0225240 A1 *  7/2022 Fakoorian ......... H04W 72/21

FOREIGN PATENT DOCUMENTS

EP          4013131 A1 *  6/2022  ............ H04W 52/02

OTHER PUBLICATIONS

Intel Corporation: "Considerations on PDCCH-based Power Saving Signal", 3GPP TSG-RAN WG1 #98, R1-1908656, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, 9 Pages, XP051765264, Para [0001], [02.2], [02.3].
International Search Report and Written Opinion—PCT/US2023/023140—ISA/EPO—Sep. 14, 2023 (2202997WO).

* cited by examiner

*Primary Examiner* — Abdullahi E Salad
(74) *Attorney, Agent, or Firm* — Holland & Hart / QUALCOMM Incorporated

(57) ABSTRACT

Methods, systems, and devices for wireless communication are described. A network entity may transmit control signaling that indicates a format for group common downlink control information (DCI) associated with tracking reference signal resources. The network entity may transmit the group common DCI that indicates a downlink power control configuration to be applied during transmission of tracking reference signals. A user equipment (UE) may receive the group common DCI in accordance with the format and monitor for tracking reference signals during the tracking reference signal resources in accordance with the downlink power control configurations.

30 Claims, 14 Drawing Sheets

DOWNLINK TRANSMIT POWER CONTROL GROUP COMMON DCI

FIELD OF TECHNOLOGY

The following relates to wireless communication, including downlink transmit power control group common downlink control information (DCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support techniques for power control such as to reduce power consumption for devices in a wireless communication network. For example, a UE may be configured with sets of power control parameters that may be used to determine transmission power of uplink communications. These techniques may support reduced power consumption, as well as reduced interference with other communications in the wireless communications systems.

SUMMARY

The described techniques relate to improved methods, systems, devices, and apparatuses that support downlink transmit power control group common downlink control information (DCI). For example, the described techniques provide for a network entity transmitting control signaling that indicates a format for group common DCI associated with tracking reference signal resources. The network entity may transmit the group common DCI that indicates a downlink power control configuration to be applied during transmission of tracking reference signals. A user equipment (UE) may receive the group common DCI in accordance with the format and monitor for tracking reference signals during the tracking reference signal resources in accordance with the downlink power control configurations indicated via the group common DCI.

A method for wireless communication at a network entity is described. The method may include transmitting control signaling that indicates a format for group common downlink control information associated with a set of multiple tracking reference signal resources for downlink power control and indicates a set of multiple downlink power control configurations, transmitting the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources, and transmitting, during the one or more of the set of multiple tracking reference signal resources, the one or more tracking reference signals in accordance with the one or more downlink power control configurations indicated via the group common downlink control information.

An apparatus for wireless communication at a network entity is described. The apparatus may include a processor, memory coupled with the processor, and instructions stored in the memory. The instructions may be executable by the processor to cause the apparatus to transmit control signaling that indicates a format for group common downlink control information associated with a set of multiple tracking reference signal resources for downlink power control and indicates a set of multiple downlink power control configurations, transmit the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources, and transmit, during the one or more of the set of multiple tracking reference signal resources, the one or more tracking reference signals in accordance with the one or more downlink power control configurations indicated via the group common downlink control information.

Another apparatus for wireless communication at a network entity is described. The apparatus may include means for transmitting control signaling that indicates a format for group common downlink control information associated with a set of multiple tracking reference signal resources for downlink power control and indicates a set of multiple downlink power control configurations, means for transmitting the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources, and means for transmitting, during the one or more of the set of multiple tracking reference signal resources, the one or more tracking reference signals in accordance with the one or more downlink power control configurations indicated via the group common downlink control information.

A non-transitory computer-readable medium storing code for wireless communication at a network entity is described. The code may include instructions executable by a processor to transmit control signaling that indicates a format for group common downlink control information associated with a set of multiple tracking reference signal resources for downlink power control and indicates a set of multiple downlink power control configurations, transmit the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources, and transmit, during the one or more of the set of multiple tracking reference signal resources, the one or more tracking reference signals in accordance with the one or more downlink power control configurations indicated via the group common downlink control information.

In some examples of the method, apparatuses, and non-transitory computer-readable medium described herein, the one or more downlink power control configurations indicated via the group common downlink control information indicate one or more power control values to be applied for monitoring for the one or more tracking reference signals.

In some examples of the method, apparatuses, and non-transitory computer-readable medium described herein, the control signaling maps sets of downlink power control configurations of the set of multiple downlink power control configurations to respective indexes and the group common downlink control information indicates an index that may be mapped to the one or more downlink power control configurations via the control signaling.

In some examples of the method, apparatuses, and non-transitory computer-readable medium described herein, the one or more downlink power control configurations indicated via the group common downlink control information indicate one or more accumulation values.

In some examples of the method, apparatuses, and non-transitory computer-readable medium described herein, the control signaling maps sets of accumulation values corresponding to set of multiple downlink control configurations to respective indexes and the group common downlink control information indicates an index that may be mapped to one or more accumulation values.

In some examples of the method, apparatuses, and non-transitory computer-readable medium described herein, the group common downlink control information indicates an identifier for one or more of the set of multiple tracking reference signal resources.

In some examples of the method, apparatuses, and non-transitory computer-readable medium described herein, the one or more tracking reference signals may be transmitted according to the one or more downlink power control configurations and using the set of multiple tracking reference signal resources.

In some examples of the method, apparatuses, and non-transitory computer-readable medium described herein, the one or more tracking reference signals may be transmitted according to the one or more downlink power control configurations and using a subset of the set of multiple tracking reference signal resources.

In some examples of the method, apparatuses, and non-transitory computer-readable medium described herein, the control signaling maps subsets of the set of multiple tracking reference signal resources to respective tracking reference signal group identifiers.

In some examples of the method, apparatuses, and non-transitory computer-readable medium described herein, the group common downlink control information indicates an antenna configuration for a network entity and the antenna configuration corresponds to the one or more downlink power control configurations.

In some examples of the method, apparatuses, and non-transitory computer-readable medium described herein, the control signaling maps sets of downlink power control configurations of the set of multiple downlink power control configurations to respective antenna configurations.

In some examples of the method, apparatuses, and non-transitory computer-readable medium described herein, the control signaling maps sets of downlink power control configurations of the set of multiple downlink power control configurations to respective power saving mode identifiers and the group common downlink control information indicates a power saving mode identifier mapped to the one or more downlink power control configurations.

In some examples of the method, apparatuses, and non-transitory computer-readable medium described herein, the group common downlink control information indicates downlink power control configurations for a set of multiple user equipment (UEs), tracking reference signal resource identifiers to use for applying the downlink power control configurations, or both.

In some examples of the method, apparatuses, and non-transitory computer-readable medium described herein, the configuration indicates a location of the group common downlink control information, a length of the group common downlink control information, or both.

In some examples of the method, apparatuses, and non-transitory computer-readable medium described herein, the set of multiple downlink power control configurations indicate power offset values, synchronization signal power offset values, or both.

A method for wireless communication at a UE is described. The method may include receiving control signaling that indicates a format for group common downlink control information associated with a set of multiple tracking reference signal resources for downlink power control and indicates a set of multiple downlink power control configurations, receiving the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources, and monitoring, during the one or more of the set of multiple tracking reference signal resources, for the one or more tracking reference signals in accordance with the one or more downlink power control configurations indicated via the group common downlink control information.

An apparatus for wireless communication at a UE is described. The apparatus may include a processor, memory coupled with the processor, and instructions stored in the memory. The instructions may be executable by the processor to cause the apparatus to receive control signaling that indicates a format for group common downlink control information associated with a set of multiple tracking reference signal resources for downlink power control and indicates a set of multiple downlink power control configurations, receive the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources, and monitor, during the one or more of the set of multiple tracking reference signal resources, for the one or more tracking reference signals in accordance with the one or more downlink power control configurations indicated via the group common downlink control information.

Another apparatus for wireless communication at a UE is described. The apparatus may include means for receiving control signaling that indicates a format for group common downlink control information associated with a set of multiple tracking reference signal resources for downlink power control and indicates a set of multiple downlink power control configurations, means for receiving the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources, and means for monitoring, during the one or more of the set of multiple tracking reference signal resources, for the one or more tracking reference signals in accordance with the one or more downlink power control configurations indicated via the group common downlink control information.

A non-transitory computer-readable medium storing code for wireless communication at a UE is described. The code may include instructions executable by a processor to receive control signaling that indicates a format for group common downlink control information associated with a set of multiple tracking reference signal resources for downlink power control and indicates a set of multiple downlink power control configurations, receive the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources, and monitor, during the one or more of the set of multiple tracking reference signal resources, for the one or more tracking reference signals in accordance with the one or more downlink power control configurations indicated via the group common downlink control information.

In some examples of the method, apparatuses, and non-transitory computer-readable medium described herein, the one or more downlink power control configurations indicated via the group common downlink control information indicate one or more power control values to be applied for monitoring for the one or more tracking reference signals.

In some examples of the method, apparatuses, and non-transitory computer-readable medium described herein, the control signaling maps sets of downlink power control configurations of the set of multiple downlink power control configurations to respective indexes and the group common downlink control information specifies an index that may be mapped to the one or more downlink power control configurations via the control signaling.

In some examples of the method, apparatuses, and non-transitory computer-readable medium described herein, the one or more downlink power control configurations indicated via the group common downlink control information indicate one or more accumulation values and monitoring for the one or more tracking reference signals includes monitoring for the one or more tracking reference signals using one or more power control values that may be based on the one or more accumulation values.

In some examples of the method, apparatuses, and non-transitory computer-readable medium described herein, the one or more power control values may be based on the one or more accumulation values and one or more other power control values configured prior to receiving the group common downlink control information.

In some examples of the method, apparatuses, and non-transitory computer-readable medium described herein, the control signaling maps sets of accumulation values corresponding to set of multiple downlink control configurations to respective indexes and monitoring for the one or more tracking reference signals includes monitoring for the one or more tracking reference signals using one or more power control values that may be based on the one or more accumulation values mapped to an index specified in the group common downlink control information.

In some examples of the method, apparatuses, and non-transitory computer-readable medium described herein, the group common downlink control information indicates an identifier for one or more of the set of multiple tracking reference signal resources.

Some examples of the method, apparatuses, and non-transitory computer-readable medium described herein may further include operations, features, means, or instructions for monitoring for the one or more tracking reference signals includes monitoring for the one or more tracking reference signals using the one or more downlink power control configurations during the set of multiple tracking reference signal resources.

Some examples of the method, apparatuses, and non-transitory computer-readable medium described herein may further include operations, features, means, or instructions for monitoring for the one or more tracking reference signals includes monitoring for the one or more tracking reference signals using the one or more downlink power control configurations during a subset of the set of multiple tracking reference signal resources.

In some examples of the method, apparatuses, and non-transitory computer-readable medium described herein, the control signaling maps subsets of the set of multiple tracking reference signal resources to respective tracking reference signal group identifiers.

In some examples of the method, apparatuses, and non-transitory computer-readable medium described herein, the group common downlink control information indicates an antenna configuration for a network entity and the antenna configuration corresponds to the one or more downlink power control configurations.

In some examples of the method, apparatuses, and non-transitory computer-readable medium described herein, the control signaling maps each set of downlink power control configurations of the set of multiple downlink power control configurations to respective antenna configurations.

In some examples of the method, apparatuses, and non-transitory computer-readable medium described herein, the control signaling maps sets of downlink power control configurations of the set of multiple downlink power control configurations to respective power saving mode identifiers and the group common downlink control information indicates a power saving mode identifier mapped to the one or more downlink power control configurations.

In some examples of the method, apparatuses, and non-transitory computer-readable medium described herein, the group common downlink control information indicates downlink power control configurations for a set of multiple UEs, tracking reference signal resource identifiers to use for applying the downlink power control configurations, or both.

In some examples of the method, apparatuses, and non-transitory computer-readable medium described herein, the configuration indicates a location of the group common downlink control information, a length of the group common downlink control information, or both.

In some examples of the method, apparatuses, and non-transitory computer-readable medium described herein, the set of multiple downlink power control configurations indicate power offset values, synchronization signal power offset values, or both.

DETAILED DESCRIPTION

The use of wireless communication technologies that support communications at high frequency may result in a high cost from network energy consumption standpoint. Network energy savings techniques may support adoption and expansion of cellular networks. For power control at the network side (e.g., network entities), a UE may be radio resource control (RRC) configured with power control configurations that the UE uses for channel measurements and reporting (e.g., channel state information (CSI) reporting). A network entity may use reports (e.g., CSI reports) received from UEs to adjust power for subsequent downlink transmissions. However, RRC signaling may be associated with high energy and resource utilization by a network entity when used for frequent power adjustments to reduce power consumption.

Techniques described herein support the use of control signaling and group common downlink control information (DCI) to support power control at a network entity. A network entity may transmit control signaling that indicates a format for group common DCI that associated with downlink power control configurations. The network entity may transmit the group common DCI that indicates one or more downlink control configurations that are to be used for transmission of tracking reference signals during the tracking reference signal resources. The network entity may transmit the tracking reference signals in accordance with the one or more downlink power control configurations.

In transmitting the control signaling that indicates the format for the group common downlink control information, a receiving UE may be able to decode the group common DCI to identify the power control configurations and use the power control configurations to receive and measure the tracking reference signals for CSI reporting. As DCI messaging may be less costly, in terms of power consumption and resource utilization, than RRC messaging, the group common DCI may be used to frequently update power control configurations at a UE with less power and/or resources than if RRC to update the power control configurations, and as a result, may support more frequent transmission power adjustments at the network entity. As such, the network entity may reduce overall power consumption relative to only using RRC messaging for downlink power control. These and other techniques are described in further detail with respect to the figures.

Aspects of the disclosure are initially described in the context of wireless communications systems. Aspects of the disclosure are further described with respect to a wireless communications system illustrating downlink power control, group common DCI payloads, and a process flow diagram that illustrates signaling to support downlink power control. Aspects of the disclosure are further illustrated by and described with reference to apparatus diagrams, system diagrams, and flowcharts that relate to downlink transmit power control group common dci.

Figure 1:
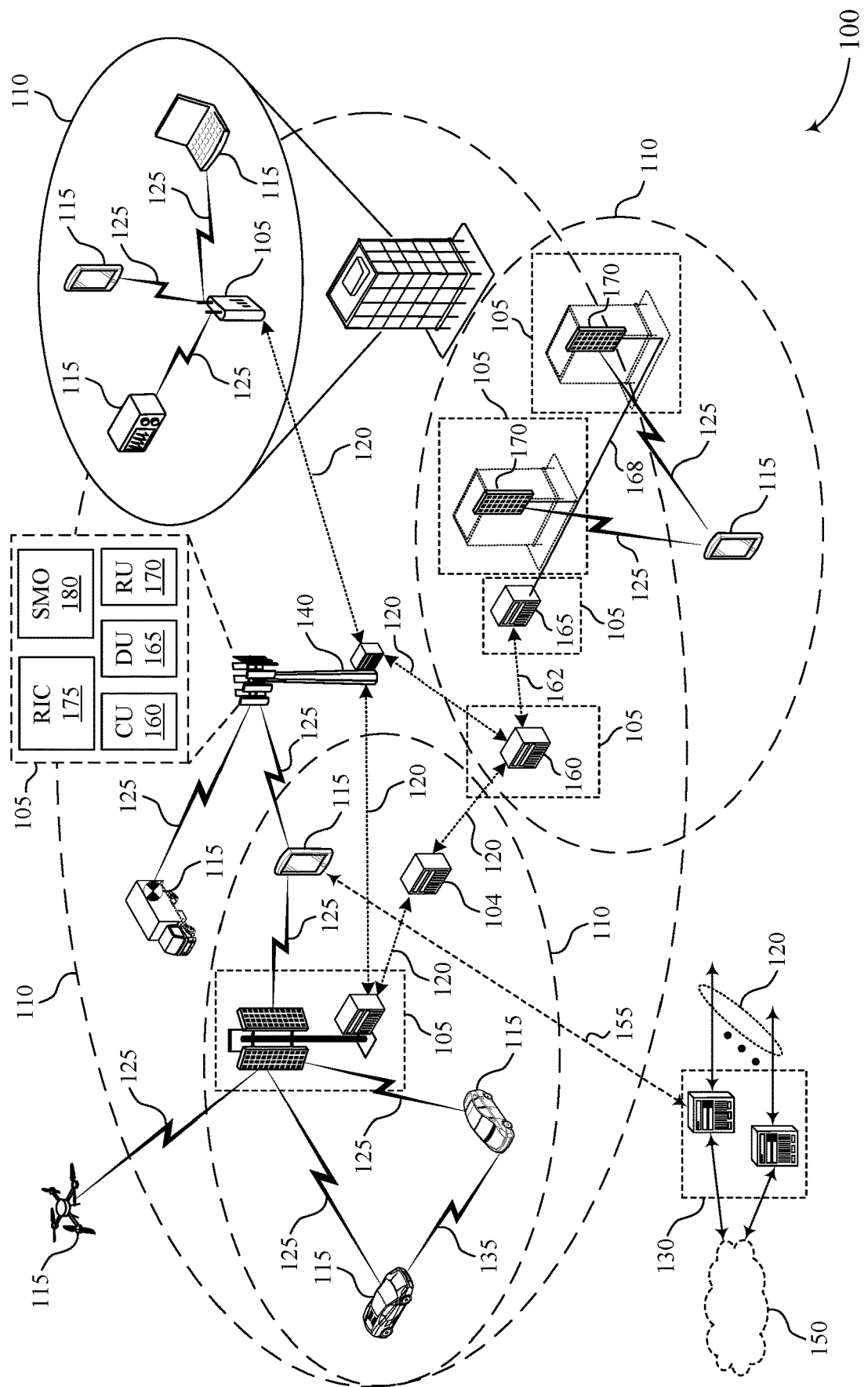
FIG. 1 illustrates an example of a wireless communications system that supports downlink transmit power control group common downlink control information (DCI) in accordance with one or more aspects of the present disclosure.

FIG. 1 illustrates an example of a wireless communications system 100 that supports downlink transmit power control group common DCI in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support downlink transmit power control group common DCI as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support techniques for power control such as to reduce overall power consumption by devices (e.g., network entities 105 and UEs 115) in the wireless communications system 100. For example, a UE 115 may be configured with a set of power control parameters that the UE 115 uses for determining uplink transmission power. In some examples, these parameters are configured using control signaling, such as RRC, medium access control layer control element (MAC-CE), DCI, or a combination thereof. A network entity may also configure the UE 115 with parameters that the UE 115 is to use for reference signal measurements and reporting, and a network entity 105 may use received measurement reports for downlink power control. However, RRC signaling techniques may be used to configure the UE with the downlink power control parameters, and RRC signaling may not support frequent power adjustments and may require significant resource overhead relative to other types of signaling (e.g., DCI). As a result, some wireless communications systems may be associated with a high cost from a network energy consumption standpoint.

Techniques described herein support improved downlink power control at a network entity 105. A network entity may use group common DCI to configure one or more UEs 115 with downlink power control configurations. As DCI signaling may not use the amount of resources as RRC signaling, the group common DCI may support more frequent power control adjustments, and as a result, overall reduction of power consumption at network devices (e.g., network entity 105) in the wireless communications system 100.

Figure 2:
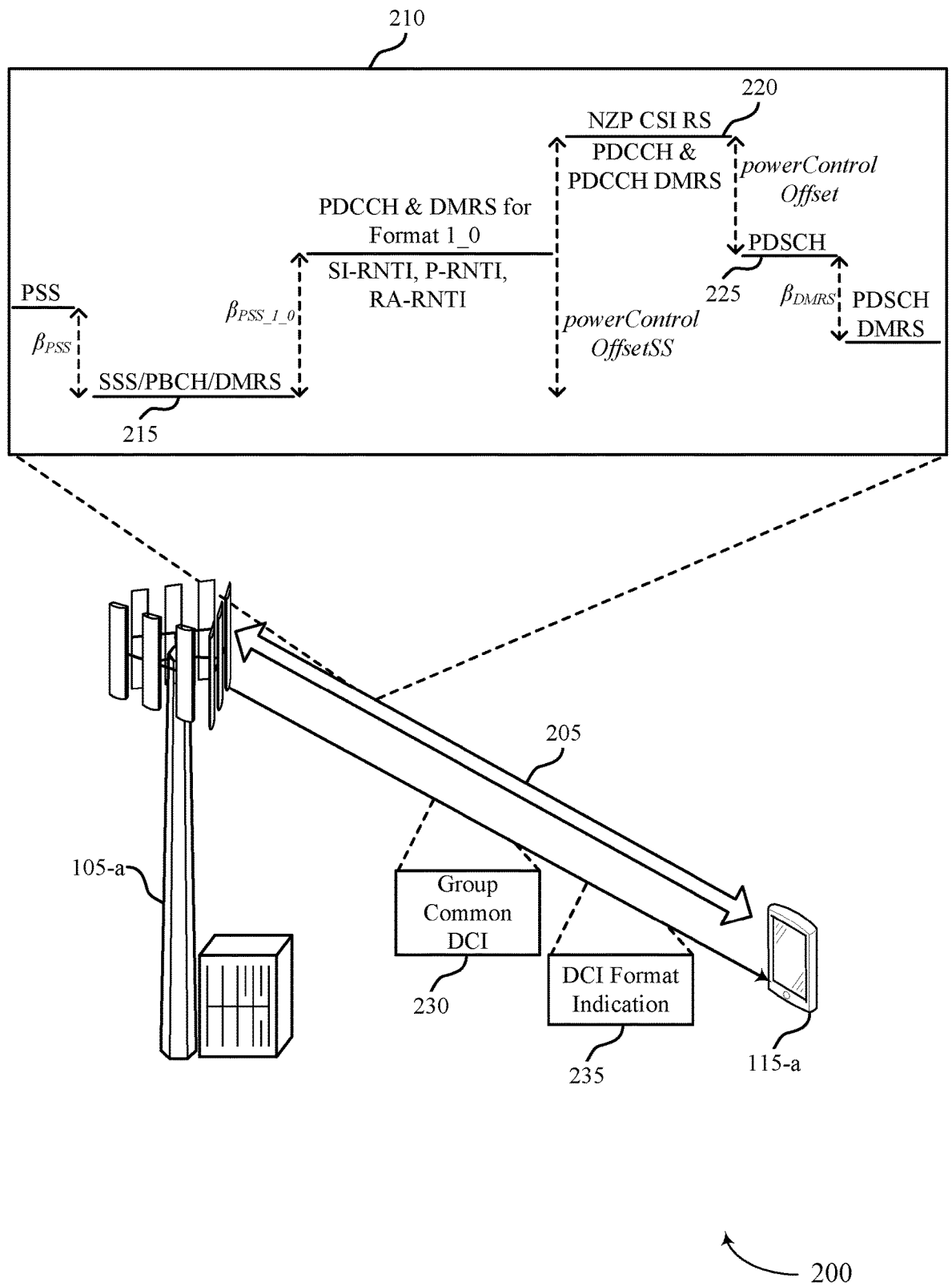
FIG. 2 illustrates an example of a wireless communications system that supports downlink transmit power control group common dci in accordance with one or more aspects of the present disclosure.

FIG. 2 illustrates an example of a wireless communications system 200 that supports downlink transmit power control group common DCI in accordance with one or more aspects of the present disclosure. The wireless communications system 200 includes a network entity 105-a and a UE 115-a, which may be examples of the network entities 105 and the UEs 115 as described with respect to FIG. 1. FIG. 2 illustrates example communications 205 between the network entity 105-a and the UE 115-a. As described herein, the network entity 105-a and the UE 115-a may implement power control techniques in order to reduce overall power consumption in the wireless communications system 200.

In cellular networks, such as a network illustrated by wireless communications system 200, the network side (e.g., the network entity 105) may account for a significant an amount of total energy consumed in the network. For example, 23% of expenses for running a cellular network may relate to energy consumption, and around 50% of the total network energy consumption may be associated with the radio area network. The increased adoption of high frequency communications may also contribute to increased energy consumption in cellular networks. As such, network energy saving techniques may support adoption and expansion of cellular networks.

Power state and transmission power control (TPC) command techniques may be used to support transmission power control for UEs 115 (e.g., the UE 115-a). Additional techniques rely on a power states to support power control for different beams or panels in devices (e.g., UE 115-a and network entity 105-a). UEs 115 may be configured with various parameters in order to determine a transmit power of an uplink transmission. For example, a TPC command may be transmitted from the network entity 105-a to the UE 115-a to configure the UE 115-a with the uplink power control parameters, and the UE 115-a may use the uplink power control parameters, in addition to various channel and reference signal measurements, to determine an uplink transmission power. The TPC command may be transmitted via a DCI format 2_2.

For downlink transmission power and as illustrated in diagram 210, the network entity 105-a may determine transmission powers for various transmissions using offsets relative to a transmission power of a signal 215 that represents or includes a secondary synchronization signal (SSS), a physical broadcast channel (PBCH), and a demodulation reference signal (DMRS). For example, the primary synchronization signal (PSS) is transmitted with a transmission power that is offset from the signal 215 based on a value of a parameter $\beta_{PSS}$. Further, a signal 220, which may represent or include a non-zero-power (NZP) CSI reference signal (NZP CSI-RS), a physical downlink control channel (PDCCH), and a PDCCH DMRS is transmitted with a transmission power that is offset from the signal 215 based on a value of a parameter powerControlOffsetSS, which may be referred to herein as a synchronization power offset value. A signal 225, which may represent or include a physical downlink shared channel (PDSCH), is transmitted with an offset from the signal 220 based on a value of a parameter powerControlOffset, which may be referred to herein as a power offset value. The parameter powerControlOffsetSS is the power offset (in dB) of the NZP-CSI-RS resource element to the SSS resource element. The parameter powerControlOffset is the power offset (in dB) of the PDSCH resource element to the NZP CSI-RS resource element.

The parameters powerControlOffset and powerControlOffsetSS may be configured at the UE 115-a using a NZP CSI-RS configuration (e.g., NZP-CSI-RS-Resource Information Element) transmitted by the network entity 105-a (e.g., via RRC signaling). The UE 115-a is configured with such of information in order to measure reference signals and report reference signal measurements. That is, a CSI-RS report transmitted by the UE 115-a to the network entity 105-a may include measurements that are based on the parameters powerControlOffset and powerControlOffsetSS. The network entity 105-a may use the information included in the report to adjust transmission powers of subsequent transmissions.

As such, downlink power adaption may be used to conserve energy on the network side (e.g., at the network entity 105-a), However, to support power adaption, the network entity 105-a may need to frequently adapt or adjust the parameters powerControlOffset and powerControlOffsetSS. These parameters may be RRC configured (e.g., via the NZP CSI_RS configuration), and RRC signaling may be costly from a resource utilization standpoint.

Techniques described herein support a group common DCI 230 for downlink power control. The group common DCI 230 (e.g., a DCI format 2_8) may include indications of one or more downlink power control configurations. The downlink power control configurations may correspond to respective values for the parameters powerControlOffset and powerControlOffsetSS. The respective values may be indicated via the group common DCI 230 using various techniques. According to a first option, the respective values for powerControlOffset and powerControlOffsetSS may be indicated by the group common DCI 230 using respective accumulation values. The indicated accumulation values may be respectively added to a previously calculated powerControlOffset and powerControlOffsetSS to obtain a new value for a tracking reference signal (TRS) transmission power. An accumulation value is a value that is to be added to a previously calculated or indicated value for a parameter. Example accumulation values may include, without limitation, "−6 dB," "−15 dB," "0 dB," "+3 dB," and "+7 dB," and these indicated values may be added to a previously indicated or calculated (e.g., based on a previously indicated accumulation value) value. In an example, the group common DCI 230 may indicate a first value for powerControlOffset, a second value for powerControlOffsetSS, or both, that may be used for determining the TRS transmission power.

According to a second option, the group common DCI 230 may indicate respective absolute values for the parameters powerControlOffset and powerControlOffsetSS. An absolute value is an actual value that is irrespective of relationship to a previously indicated or calculated value. Example absolute values may include, without limitation, "−15 dB," "−7 dB," "0 dB," "7 dB," and "−20 dB," "−7 dB," and "20 dB." In an example, the group common DCI 230 may indicate a first absolute value for powerControlOffset, a second absolute value for powerControlOffsetSS, or both, that may be used for determining the TRS transmission power.

According to a third option, the values for the parameters powerControlOffset and powerControlOffsetSS may be indicated by the group common DCI 230 based on an antenna configuration. As such, the UE 115-a may be configured (e.g., via RRC signaling) to adjust the TRS power configuration based on an indicated antenna configuration. In an example, each antenna configuration of a set of antenna configurations may be associated with values for powerControlOffset and powerControlOffsetSS. When the UE 115-a is configured via control signaling with an antenna configuration, the UE 115-a may use the corresponding values for powerControlOffset and powerControlOffsetSS to determine the TRS transmission power. The values for powerControlOffset and powerControlOffsetSS may be accumulation values or absolute values.

According to a fourth option, the values for the parameters powerControlOffset and powerControlOffsetSS may be indicated by the group common DCI 230 according to an energy saving mode adaptation. For this option, the UE may be RRC configured to adjust the TRS power configuration based on an indicated energy saving mode. In an example, each energy saving mode of a set of energy saving mode may be associated with values for powerControlOffset and powerControlOffsetSS. When the UE 115-a is configured via control signaling with an energy saving mode, the UE 115-a may use the corresponding values for powerControlOffset and powerControlOffsetSS to determine the TRS transmission power. The values for powerControlOffset and powerControlOffsetSS may be accumulation values or absolute values.

In addition to indicating the one or more downlink control configurations, the group common DCI 230 may indicate a TRS resource set identifier for a TRS resource set to which the one or more downlink power control configurations (e.g., values for powerControlOffset and powerControlOffsetSS) are applicable. The TRS resource set may indicate one or more TRS resources in which one or more TRSs are communicated.

As such, the group common DCI 230 may be used to configure the UE 115-a with downlink power control configurations. The UE 115-a may monitor for tracking reference signals during the indicated tracking reference signal resources and based on the downlink power control configurations. In some cases, the UE 115-a may use the downlink power control configurations to perform measurements on the tracking reference signals and report such measurements to the network entity 105-a, and the network entity 105-a may use the received measurements to perform downlink transmission power adjustments. As such, using the group common DCI 230 described herein, the network entity may more frequently configure the UE 115-a with new power control configurations such as to support more frequent power adjustments the network entity 105-a, which may result in more efficient power utilization in the wireless communications system 200.

To support the use of the group common DCI 230 for power control configuration, the network entity 105-a may transmit control signaling (e.g., DCI format indication 235) that indicates a format for the group common DCI 230. In some examples, the control signaling is RRC signaling. The control signaling may configure the UE 115-a with a location and size of the intended payload in the group common DCI 230 that may include the indication of the downlink power control configuration (e.g., the values for the power control parameters) and the TRS resource set identifier.

Additionally, or alternatively, the control signaling may also configure the UE 115-a with tables or information that may be subsequently signaled via the group common DCI 230. For example, the control signaling may map power control configurations to indexes, and one or more of the indexes may be signaled by the group common DCI 230. The control signaling may additionally or alternatively map sets of accumulation values corresponding to the downlink control configurations to indexes, and one or more of the indexes may be signaled by the group common DCI 230.

In some examples, the control signaling may configure the UE 115-a with a table of antenna configurations that are mapped to downlink power control configurations (e.g., TRS power configurations). Table 1 includes example mappings that may be signaled via the control signaling:

TABLE 1

| Antenna Configuration | TRS Power Configuration |
|---|---|
| 8 × 8 | Config1/poweroffset1/poweroffsetSS1 |
| 4 × 8 | Config2/poweroffset2/poweroffsetSS2 |
| 4 × 4 | Config3/poweroffset3/poweroffsetSS3 |
| 2 × 4 | Config4/poweroffset4/poweroffsetSS4 |
| 2 × 2 | Config5/poweroffset5/poweroffsetSS5 |

Thus, a set of antenna configurations may be mapped to respective downlink power control configurations, which may include values for the parameters powerControlOffset and powerControlOffsetSS. These configuration mappings may be configured at the UE 115-a via RRC signaling. The group common DCI 230 may indicate one of the antenna configurations, and the UE 115-a may use the corresponding downlink power control configuration to perform tracking reference signal monitoring, measurements, and reporting.

Additionally, or alternatively, the control signaling may configure the UE 115-a with a table of indexes that are mapped to power control configurations (e.g., TRS power configurations). Table 2 includes example mappings that may be signaled via the control signaling:

TABLE 2

| DL Tx Power Control Index | PowerOffset | PowerOffsetSS |
|---|---|---|
| 00 | Value1 | Value1' |
| 01 | Value2 | Value2' |
| 10 | Value3 | Value3' |
| 11 | Value4 | Value4' |

Thus, a set of indexes may be mapped to respective downlink power control configurations, which may include values for the parameters powerControlOffset and powerControlOffsetSS. These configuration mappings may be configured at the UE 115-a via RRC signaling. The group common DCI 230 may indicate one of indexes, and the UE 115-a may use the corresponding downlink power control configuration to perform tracking reference signal monitoring, measurements, and reporting.

Additionally, or alternatively, the control signaling may configure the UE 115-a with a table of indexes that are mapped to accumulation values and/or absolute values that are used to update the TRS power configuration. Table 3 includes example mappings that may be signaled via the control signaling:

TABLE 3

| DL TPC | Accumulation powerOffset | Absolute powerOffset | Accumulation powerOffsetSS | Absolute powerOffsetSS |
|---|---|---|---|---|
| 00 | −6 dB | −15 dB | −6 dB | −20 dB |
| 01 | −3 dB | −7 dB | −3 dB | −7 dB |
| 10 | 0 dB | 0 dB | 0 dB | 0 dB |
| 11 | +3 dB | +7 dB | +3 dB | +20 dB |

Thus, a set of indexes may be mapped to respective downlink power control configurations, which may include values for the parameters powerControlOffset and powerControlOffsetSS. These configuration mappings may be configured at the UE 115-a via RRC signaling. The group common DCI 230 may indicate one or more if the indexes, and the UE 115-a may use the corresponding downlink power control configurations to perform tracking reference signal monitoring, measurements and reporting.

The accumulation values may be added to a prior configured value to determine or configure the value to use for tracking reference signal monitoring. For example, if a value for powerControlOffset configured via RRC signaling or via a prior group common DCI is 12 dB, and the group common DCI 230 indicates −6 dB (e.g., via an index of 00 as shown in Table 3 or via an explicit indication), then the UE 115-a may determine (e.g., update or configure) that powerControlOffset value to be used for monitoring, measurements, and reporting is 6 dB (e.g., 12 dB minus 6 dB=6 dB). In some cases, an initial value is RRC configured, then the accumulation values are indicated via group common DCIs to update the values. In such cases, the group common DCI indicated power control value may be applied to a prior determined power control value, and as such, the power control values are accumulated.

Thus, various techniques may be used to configure and indicate downlink power control configurations that the UE 115-a is to use for monitoring tracking reference signals transmitted by the network entity 105-a. The UE 115-a may be configured with a format for the DCI and may be configured with mappings such that the group common DCI 230 may be used for downlink power control. These techniques may support reduced power consumption in the wireless communications system 200.

Figure 3A:
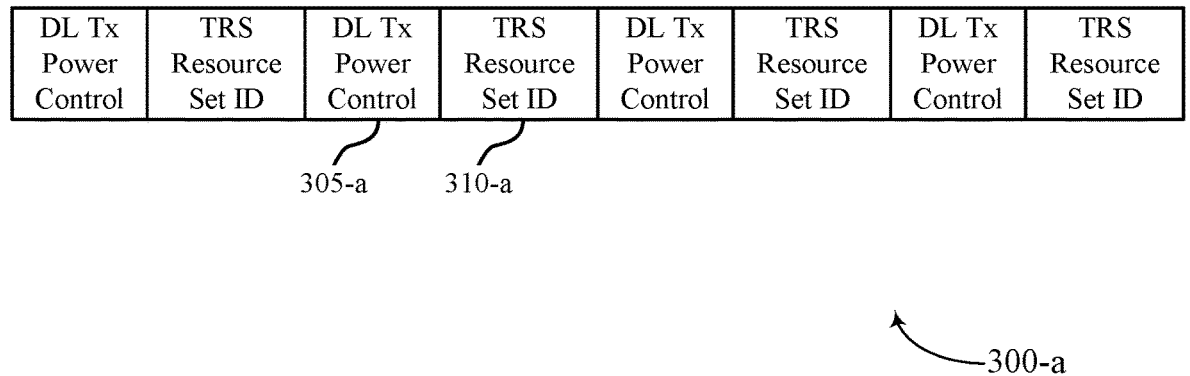
FIG. 3A and FIG. 3B illustrate examples of group common DCI payloads that support downlink transmit power control group common DCI in accordance with one or more aspects of the present disclosure.
Figure 3B:
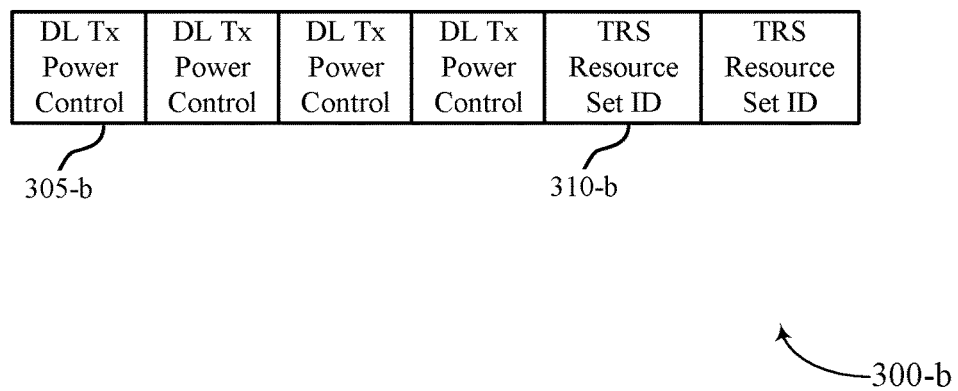

FIG. 3A and FIG. 3B illustrate examples DCI payloads 300 that support downlink transmit power control group common DCI in accordance with one or more aspects of the present disclosure. The DCI payloads 300 may be transmitted by a network entities 105 and received by UEs 115, which may be examples of the corresponding devices as described with respect to FIGS. 1 and 2. A UE 115 may be configured via control signaling (e.g., RRC) with a format for group common DCI such that the UE 115 is configured to monitor for the group common DCI in corresponding control resources. The group common DCI may indicate one or more power control configurations, and the UE 115 may monitor for tracking reference signals transmitted by the network entity 105 based on the downlink power control configurations indicated by the group common DCI.

FIG. 3A and FIG. 3B illustrate example group common DCI payload formats, but it should be understood that other formats are contemplated within the scope of the present disclosure. In FIG. 3A, the group common DCI payload 300-a includes indications of downlink power control configurations (e.g., an indication 305-a) followed by corresponding TRS resource set identifiers (e.g., a TRS resource set identifier 310-a). In the depicted example, payload format indicates that the downlink power control configurations immediately precede a corresponding TRS resource set identifier. The control signaling described herein may indicate to a UE 115 a location in the DCI and the length of the payload (e.g., the downlink power control configuration indication and the TRS resource set identifier) such that the UE 115 is able to identify the payload, the location(s) of the respective downlink power control configurations, and the location(s) of the respective TRS resource set identifier(s). Thus, each pair of downlink power control configuration indications and TRS resource set identifiers of the group common DCI payload 300-a may be intended for a different UE 115.

In FIG. 3B, the group common DCI payload 300-b includes a set of indications of downlink power control configurations (e.g., an indication 305-b) followed by a set of TRS resource set identifiers (e.g., TRS resource set identifier 310-b). In this example, the downlink power control configuration indications are concatenated and followed by the set of TRS resource set identifiers. In this example, DCI payload format, TRS resource set identifiers may be applicable to multiple downlink power control configuration indications, which may support reduced payload size. In another format, multiple indications of downlink power control configurations may be followed by a single TRS resource set identifier, and this pattern may be repeated, such that the TRS resource set identifier common to multiple downlink power control configurations.

The UE 115 may be configured with multiple TRS resource sets, and as such, the group common DCI may indicate the TRS resource set identifier that corresponds to the TRS resource set for which a downlink power control configuration is applicable. However, in some examples, a smaller payload size for the group common DCI may support increased communication efficiency. In some cases, the TRS resource set identifier may not be signaled in the group common DCI, and the UE may apply the indicated downlink power control configurations for some or all of the configured TRS resource sets. In some examples, the UE 115 is configured with a large number of resource sets, and as such, a resource set identifier may include a large number of bits. To reduce the number of bits in the group common DCI payload, the UE 115 may be configured with groups of TRS resource sets and may be signaled with a resource set group index to which an indicated downlink power control identifier is applicable. That is, the UE may apply the downlink power control configuration to each TRS resource set within the indicated group. For example, if a plurality of TRS resource sets are configured into two groups, then one bit indication may be used to indicate one of the groups (e.g., a subset of a plurality of TRS resource sets) to which a downlink power control configuration is to be applied (e.g., used for monitoring TRSs).

Thus, a UE 115 may be configured with the group common DCI format such that the UE 115 is able to identify the applicable downlink power control configurations and SRS resource set identifiers. The UE 115 may use the information in the group common DCI for TRS monitoring, measurements, and reporting in order to support downlink power control and adaptation, thereby reducing overall power consumption in a wireless communications system.

Figure 4:
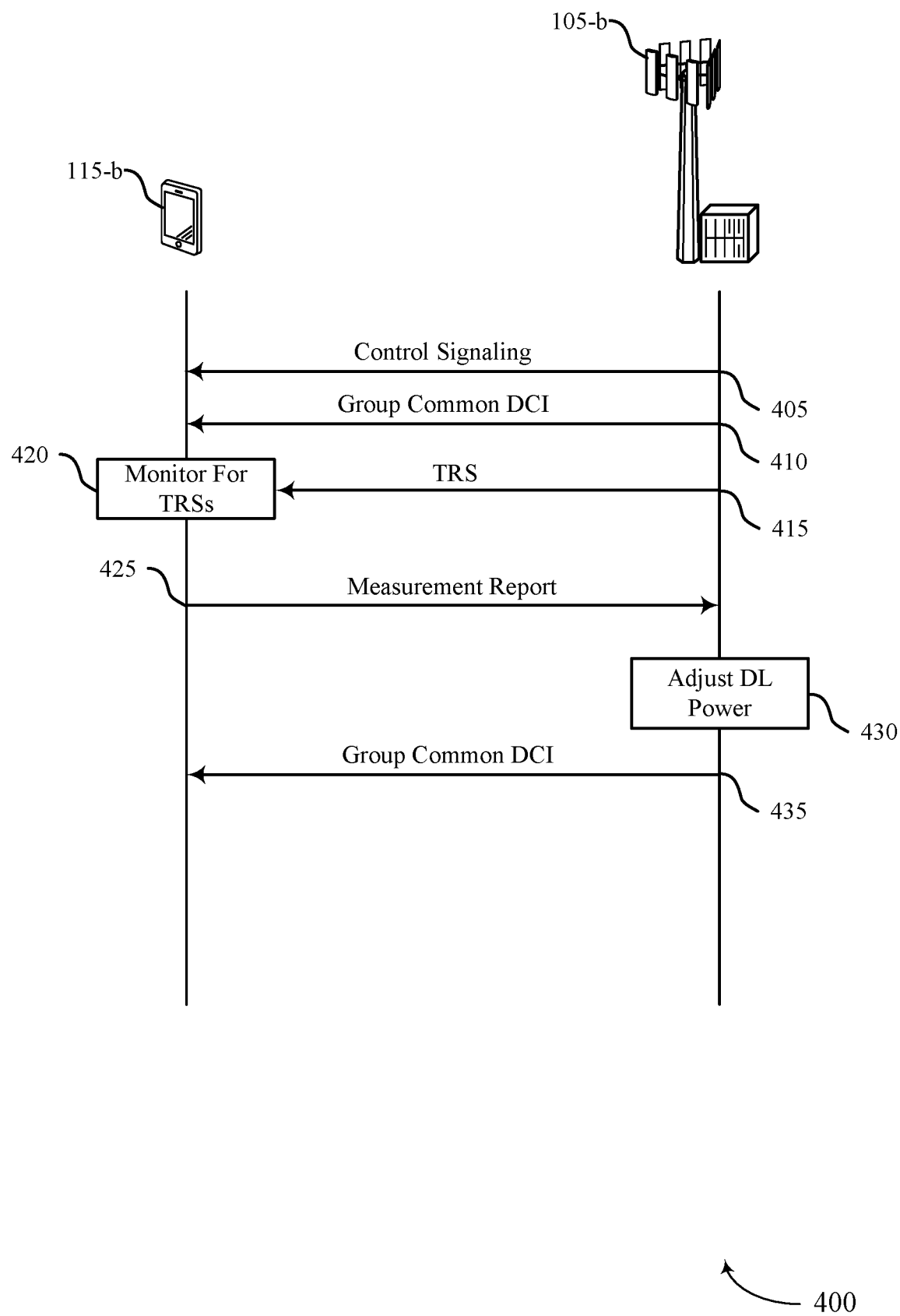
FIG. 4 illustrates an example of a process flow that supports downlink transmit power control group common DCI in accordance with one or more aspects of the present disclosure.

FIG. 4 illustrates an example of a process flow 400 that supports downlink transmit power control group common DCI in accordance with one or more aspects of the present disclosure. The process flow 400 includes a UE 115-b and a network entity 105-b, which may be examples of the corresponding devices as described with respect to FIGS. 1 through 3. The UE 115-b and the network entity 105-b may implement aspects of the process flow 400 to support downlink power control adaptation, which may result in reduced power consumption in a wireless communications system. In some examples, some signaling or procedure of the process flow 400 may occur in different orders than shown. Additionally, or alternatively, some additional procedures of signaling may occur, or some signaling or procedures may not occur.

At 405, the network entity 105-b may transmit and the UE 115-b may receive control signaling that indicates a format for group common DCI associated with a plurality of TRS resources for downlink power control and indicates a plurality of downlink power control configurations. The control signaling may be RRC signaling that indicates initial values for parameters for downlink power control configurations (e.g., values powerControlOffset and powerControlOffsetSS), indicates mappings of downlink power control configurations to indexes, indicates mappings of accumulation values to indexes, indicates mappings of antenna configurations to downlink power control configurations, indicates mappings of downlink power control modes to downlink power control configurations, or any combination thereof. In some examples, the control signaling may indicate the format that indicates a location of the group common downlink control information, a length of the group common downlink control information, or both.

At 410, the network entity 105-b may transmit and the UE 115-b may receive the group common DCI in accordance with the format. The group common DCI may indicate one or more downlink power control configurations of the plurality of downlink power control configurations to be applied during transmission of one or more TRSs during one or more of the plurality of TRS resources. In some examples, the one or more downlink power control configurations indicated by the group common DCI indicate one or more power control values (e.g., values for powerControlOffset and powerControlOffsetSS) to be applied for monitoring for the one or more TRSs. The group common DCI may also indicate an identifier for one or more TRS resources during which the UE 115-b is to monitor using the downlink power control configurations. The group common DCI may indicate the one or more downlink power control configurations via an index mapped to the one or more power control configurations, via an index mapped to accumulation values corresponding to the downlink power control configurations, via an antenna configuration mapped to the downlink power control configurations, via a power control mode mapped to the downlink power control configurations, or a combination thereof.

At 415, the network entity 105-b may transmit, during the one or more of the plurality of TRS resources, the one or more TRSs in accordance with the one or more downlink power control configurations indicated by the group common downlink control information. For example, the network entity 105-b may use the transmission powers based on the power control values (e.g., values for powerControlOffset and powerControlOffsetSS) of the indicated power control configuration(s). The plurality of TRS resources may be time resources, frequency resources, spatial resources, or any combination thereof, in which the TRSs are communicated.

At 420, the UE 115-b may monitor, during the one or more of the plurality of TRS resources, for the one or more TRSs in accordance with the one or more downlink power control configurations indicated by the group common downlink control information. For example, the UE 115-b may monitor for the TRSs based on power control values (e.g., accumulation values) corresponding to the downlink power control configurations.

At 425, the UE 115-b may transmit, to the network entity 105-b, a measurement report that is indicative of a result of monitoring/measuring of TRSs during the tracking reference signal resources in accordance with the downlink power control configuration(s). At 430, the network entity 105-b may adjust a downlink transmission power based on the received measurement report. At 435, the network entity 105-b may transmit a second group common DCI, and the second group common DCI may update the one or more downlink power control configurations. More particularly, the second group common DCI may update the power control values signaled by the group common DCI transmitted at 410. In some examples, the network entity 105-b may transmit the second group common DCI based on, or in response to, the downlink transmission power being adjusted.

Figure 5:
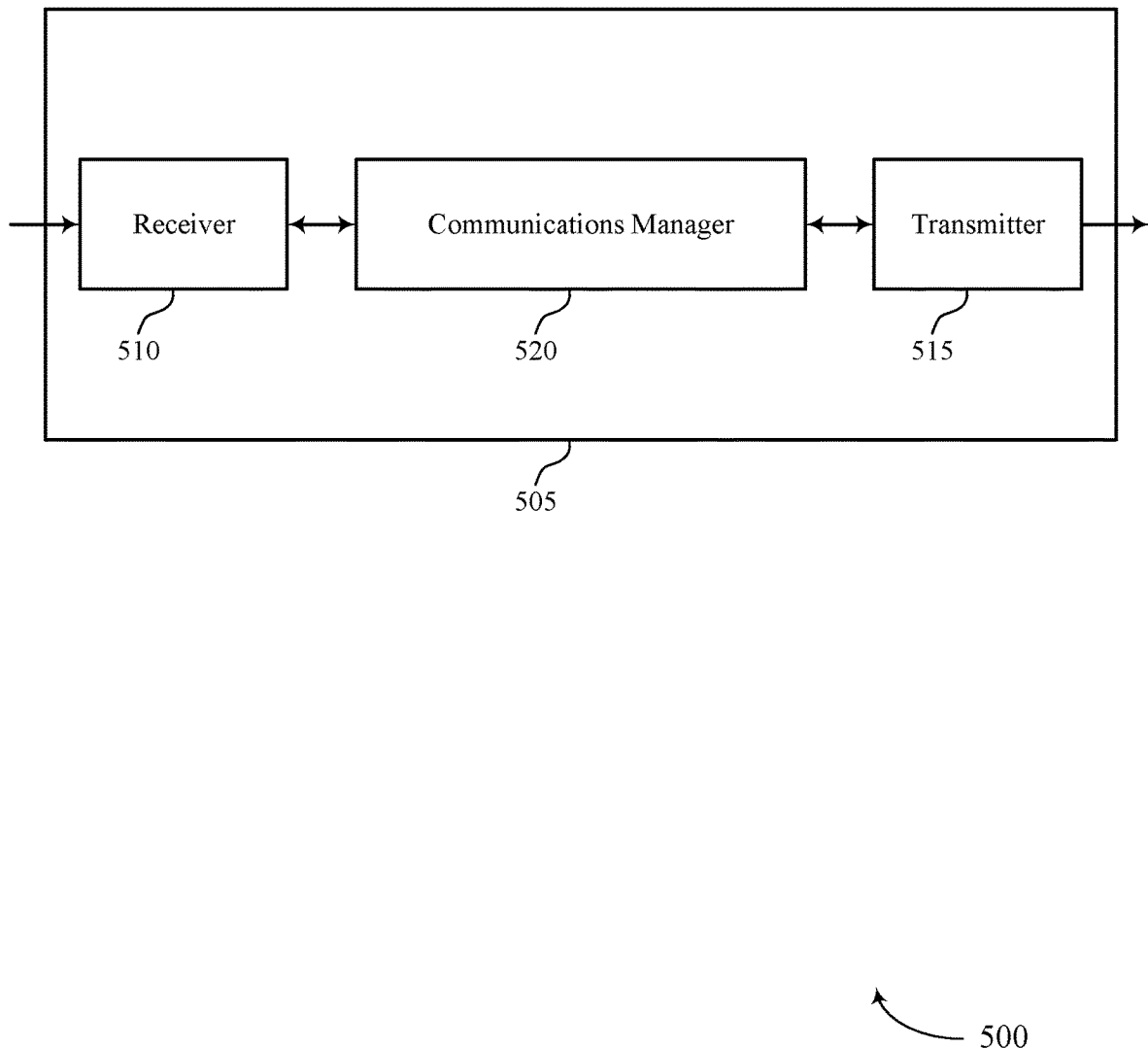
FIGS. 5 and 6 show block diagrams of devices that support downlink transmit power control group common DCI in accordance with one or more aspects of the present disclosure.

FIG. 5 shows a block diagram 500 of a device 505 that supports downlink transmit power control group common DCI in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of downlink transmit power control group common DCI as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a network entity in accordance with examples as disclosed herein. For example, the communications manager 520 may be configured as or otherwise support a means for transmitting control signaling that indicates a format for group common downlink control information associated with a set of multiple tracking reference signal resources for downlink power control and indicates a set of multiple downlink power control configurations. The communications manager 520 may be configured as or otherwise support a means for transmitting the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The communications manager 520 may be configured as or otherwise support a means for transmitting, during the one or more of the set of multiple tracking reference signal resources, the one or more tracking reference signals in accordance with the one or more downlink power control configurations indicated via the group common downlink control information.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption by using group common DCI signaling to support downlink power control adaptation.

Figure 6:
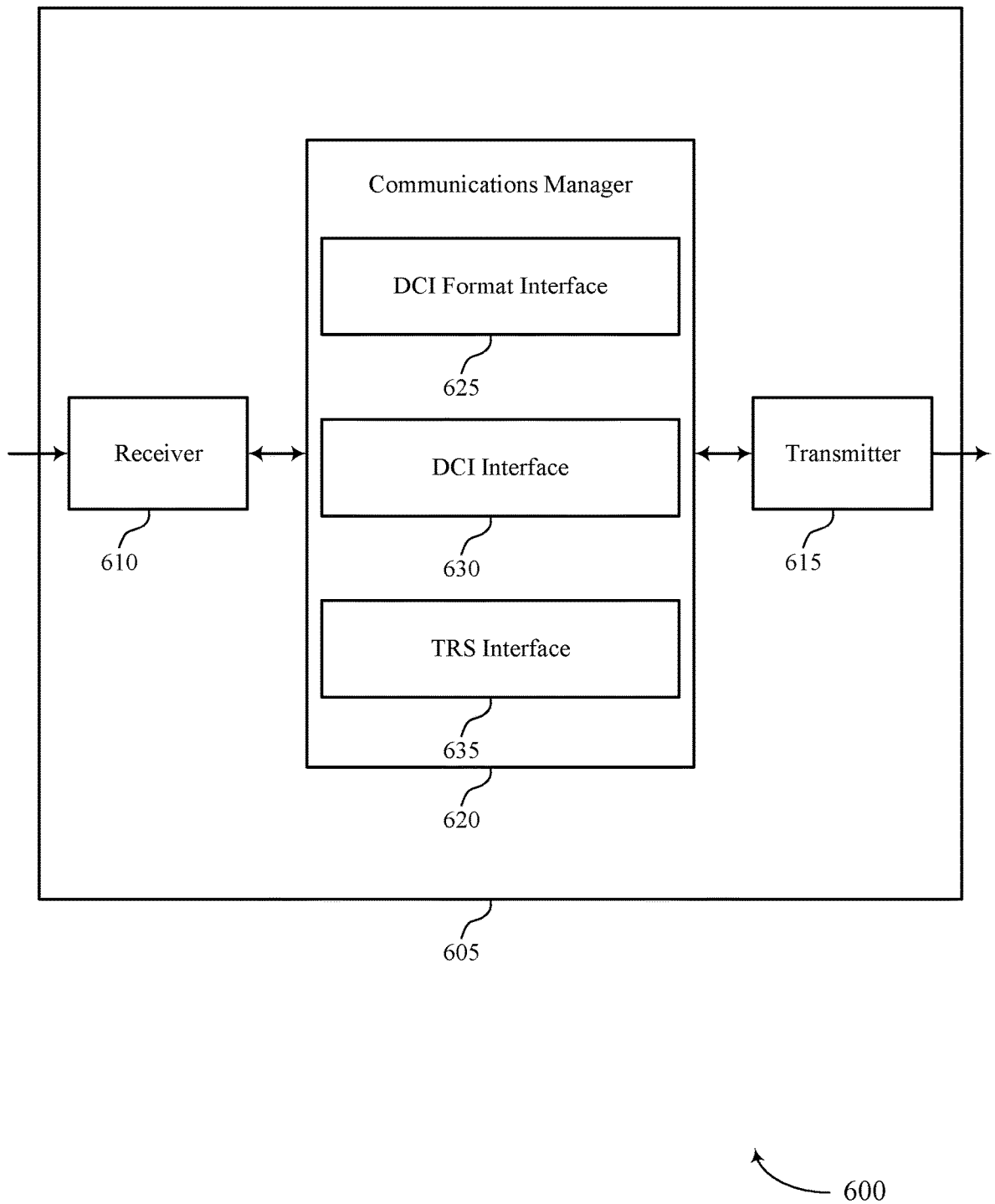

FIG. 6 shows a block diagram 600 of a device 605 that supports downlink transmit power control group common DCI in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of downlink transmit power control group common DCI as described herein. For example, the communications manager 620 may include a DCI format interface 625, a DCI interface 630, an TRS interface 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a network entity in accordance with examples as disclosed herein. The DCI format interface 625 may be configured as or otherwise support a means for transmitting control signaling that indicates a format for group common downlink control information associated with a set of multiple tracking reference signal resources for downlink power control and indicates a set of multiple downlink power control configurations. The DCI interface 630 may be configured as or otherwise support a means for transmitting the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The TRS interface 635 may be configured as or otherwise support a means for transmitting, during the one or more of the set of multiple tracking reference signal resources, the one or more tracking reference signals in accordance with the one or more downlink power control configurations indicated via the group common downlink control information.

Figure 7:
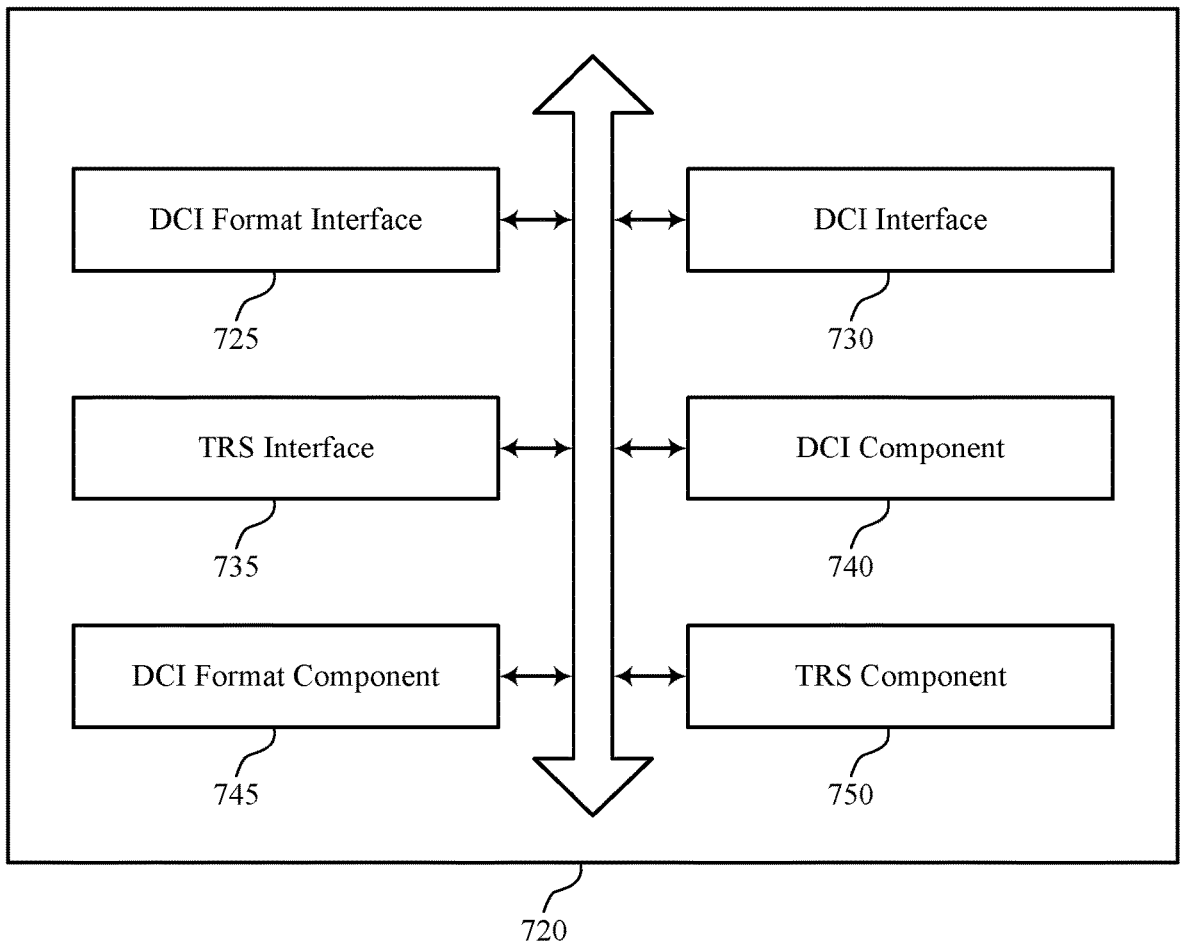
FIG. 7 shows a block diagram of a communications manager that supports downlink transmit power control group common DCI in accordance with one or more aspects of the present disclosure.

FIG. 7 shows a block diagram 700 of a communications manager 720 that supports downlink transmit power control group common DCI in accordance with one or more aspects of the present disclosure. The communications manager 720 may be an example of aspects of a communications manager 520, a communications manager 620, or both, as described herein. The communications manager 720, or various components thereof, may be an example of means for performing various aspects of downlink transmit power control group common DCI as described herein. For example, the communications manager 720 may include a DCI format interface 725, a DCI interface 730, an TRS interface 735, a DCI component 740, a DCI format component 745, an TRS component 750, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication at a network entity in accordance with examples as disclosed herein. The DCI format interface 725 may be configured as or otherwise support a means for transmitting control signaling that indicates a format for group common downlink control information associated with a set of multiple tracking reference signal resources for downlink power control and indicates a set of multiple downlink power control configurations. The DCI interface 730 may be configured as or otherwise support a means for transmitting the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The TRS interface 735 may be configured as or otherwise support a means for transmitting, during the one or more of the set of multiple tracking reference signal resources, the one or more tracking reference signals in accordance with the one or more downlink power control configurations indicated via the group common downlink control information.

In some examples, the one or more downlink power control configurations indicated via the group common downlink control information indicate one or more power control values to be applied for monitoring for the one or more tracking reference signals. The one or more power control values may be indicated via the DCI component 740.

In some examples, the control signaling maps sets of downlink power control configurations of the set of multiple downlink power control configurations to respective indexes. The DCI format component 745 may indicate the mapping transmitted via the DCI format interface 725. In some examples, the group common downlink control information indicates an index that is mapped to the one or more downlink power control configurations via the control signaling. The DCI component 740 may identify the index that is indicated via the group common downlink control information transmitted by the DCI interface 730.

In some examples, the one or more downlink power control configurations indicated via the group common downlink control information indicate one or more accumulation values. The DCI component 740 may identify the accumulation values that are indicated via the group common downlink control information transmitted by the DCI interface 730.

In some examples, the control signaling maps sets of accumulation values corresponding to set of multiple downlink control configurations to respective indexes. The DCI format component 745 may identify the mapping of the sets of accumulation values to the respective indexes, and the DCI format interface 725 may indicate the mappings. In some examples, the DCI component 740 may identify the index, and the group common downlink control information transmitted via the DCI interface 730 indicates an index that is mapped to one or more accumulation values.

In some examples, the group common downlink control information transmitted via the DCI interface 730 indicates an identifier for one or more of the set of multiple tracking reference signal resources. The identifier for one or more of the set of multiple tracking reference signal resources may be identified via the DCI component 740.

In some examples, the TRS interface 735 may be configured as or otherwise support a means for the one or more tracking reference signals are transmitted according to the one or more downlink power control configurations and using the set of multiple tracking reference signal resources.

In some examples, the TRS interface 735 may be configured as or otherwise support a means for the one or more tracking reference signals are transmitted according to the one or more downlink power control configurations and using a subset of the set of multiple tracking reference signal resources.

In some examples, the control signaling transmitted via the DCI format interface 725 maps subsets of the set of multiple tracking reference signal resources to respective tracking reference signal group identifiers.

In some examples, the group common downlink control information transmitted via the DCI interface 730 indicates an antenna configuration for a network entity. In some examples, the antenna configuration corresponds to the one or more downlink power control configurations. The DCI component 740 may identify that the antenna configuration that corresponds to the one or more downlink power control configurations.

In some examples, the control signaling transmitted via the DCI format interface 725 maps sets of downlink power control configurations of the set of multiple downlink power control configurations to respective antenna configurations.

In some examples, the control signaling transmitted via the DCI format interface 725 maps sets of downlink power control configurations of the set of multiple downlink power control configurations to respective power saving mode identifiers. In some examples, the group common downlink control information transmitted via the DCI format interface 725 indicates a power saving mode identifier mapped to the one or more downlink power control configurations.

In some examples, the group common downlink control information transmitted via the DCI format interface 725 indicates downlink power control configurations for a set of multiple UEs, tracking reference signal resource identifiers to use for applying the downlink power control configurations, or both.

In some examples, the format indicated via the DCI format interface 725 indicates a location of the group common downlink control information, a length of the group common downlink control information, or both.

In some examples, the set of multiple downlink power control configurations which may be indicated via the group common downlink control information transmitted via the DCI interface 730 indicate power offset values, synchronization signal power offset values, or both.

Figure 8:
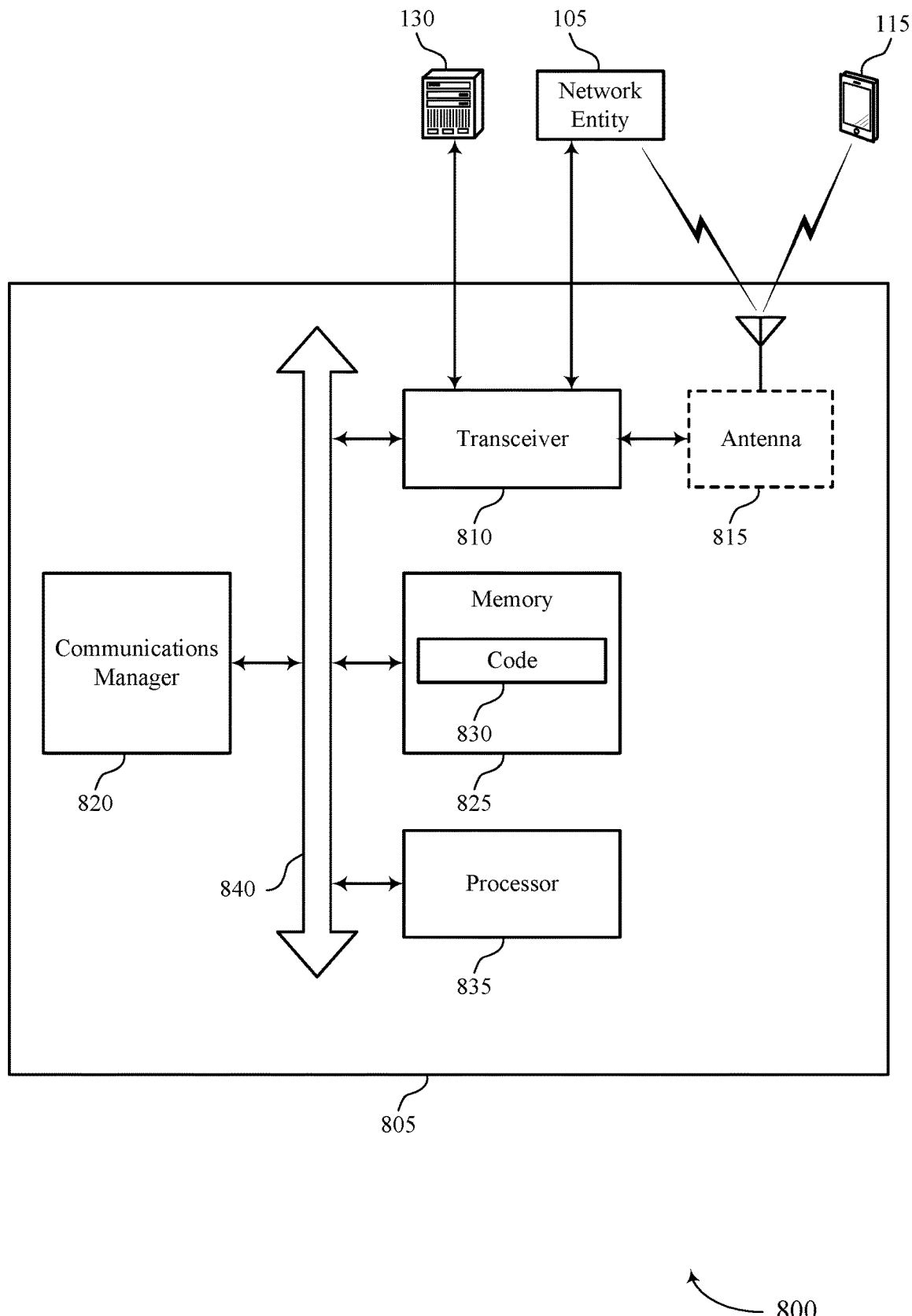
FIG. 8 shows a diagram of a system including a device that supports downlink transmit power control group common DCI in accordance with one or more aspects of the present disclosure.

FIG. 8 shows a diagram of a system 800 including a device 805 that supports downlink transmit power control group common DCI in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. The transceiver 810, or the transceiver 810 and one or more antennas 815 or wired interfaces, where applicable, may be an example of a transmitter 515, a transmitter 615, a receiver 510, a receiver 610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting downlink transmit power control group common dci). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication at a network entity in accordance with examples as disclosed herein. For example, the communications manager 820 may be configured as or otherwise support a means for transmitting control signaling that indicates a format for group common downlink control information associated with a set of multiple tracking reference signal resources for downlink power control and indicates a set of multiple downlink power control configurations. The communications manager 820 may be configured as or otherwise support a means for transmitting the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The communications manager 820 may be configured as or otherwise support a means for transmitting, during the one or more of the set of multiple tracking reference signal resources, the one or more tracking reference signals in accordance with the one or more downlink power control configurations indicated via the group common downlink control information.

By including or configuring the communications manager 820 in accordance with examples as described herein, the device 805 may support techniques for reduced power consumption by using group common DCI signaling to support downlink power control adaptation.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the processor 835, the memory 825, the code 830, the transceiver 810, or any combination thereof. For example, the code 830 may include instructions executable by the processor 835 to cause the device 805 to perform various aspects of downlink transmit power control group common DCI as described herein, or the processor 835 and the memory 825 may be otherwise configured to perform or support such operations.

Figure 9:
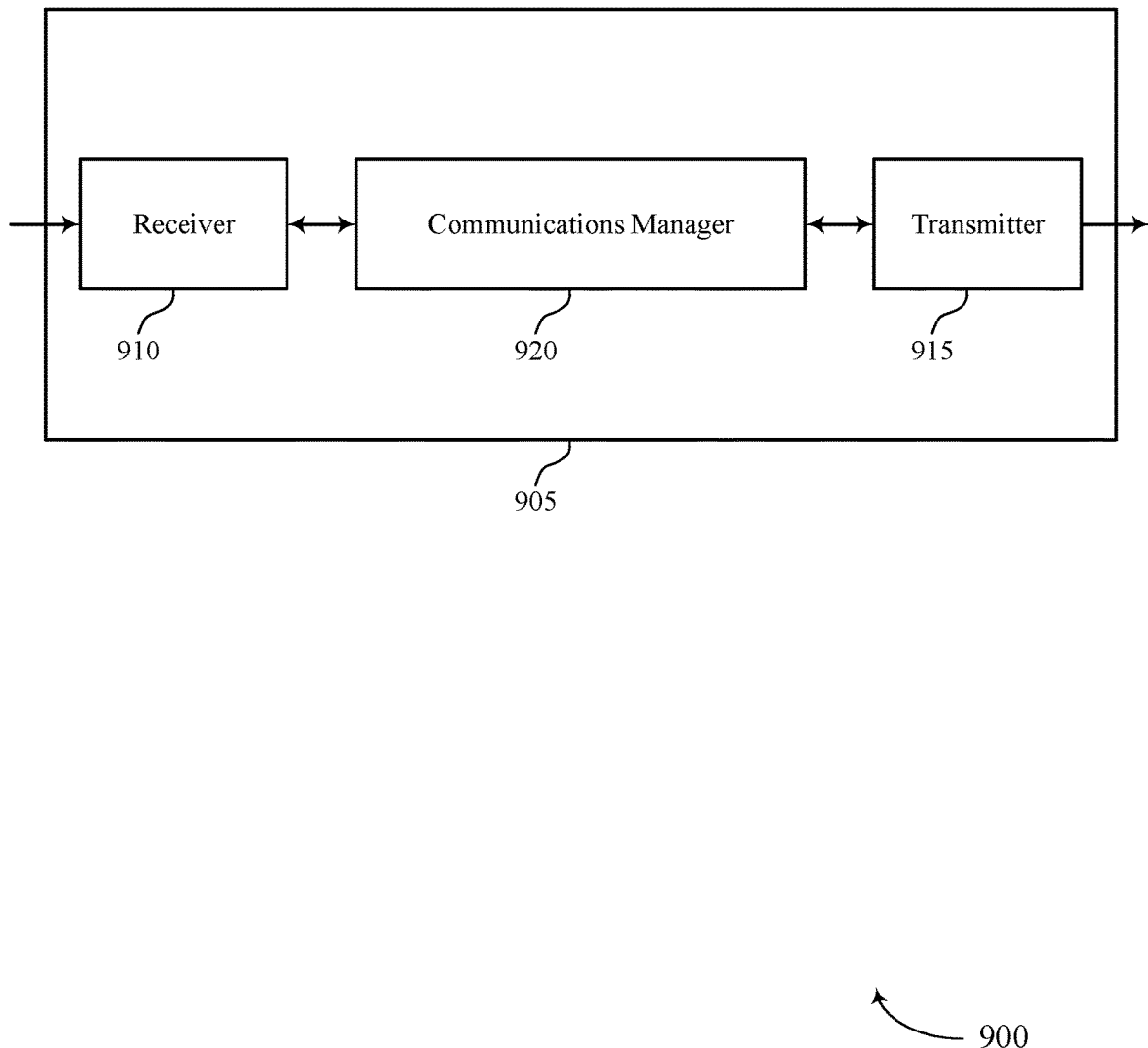
FIGS. 9 and 10 show block diagrams of devices that support downlink transmit power control group common DCI in accordance with one or more aspects of the present disclosure.

FIG. 9 shows a block diagram 900 of a device 905 that supports downlink transmit power control group common DCI in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to downlink transmit power control group common dci). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to downlink transmit power control group common dci). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of downlink transmit power control group common DCI as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving control signaling that indicates a format for group common downlink control information associated with a set of multiple tracking reference signal resources for downlink power control and indicates a set of multiple downlink power control configurations. The communications manager 920 may be configured as or otherwise support a means for receiving the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The communications manager 920 may be configured as or otherwise support a means for monitoring, during the one or more of the set of multiple tracking reference signal resources, for the one or more tracking reference signals in accordance with the one or more downlink power control configurations indicated via the group common downlink control information.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption by using group common DCI signaling to support downlink power control adaptation.

Figure 10:
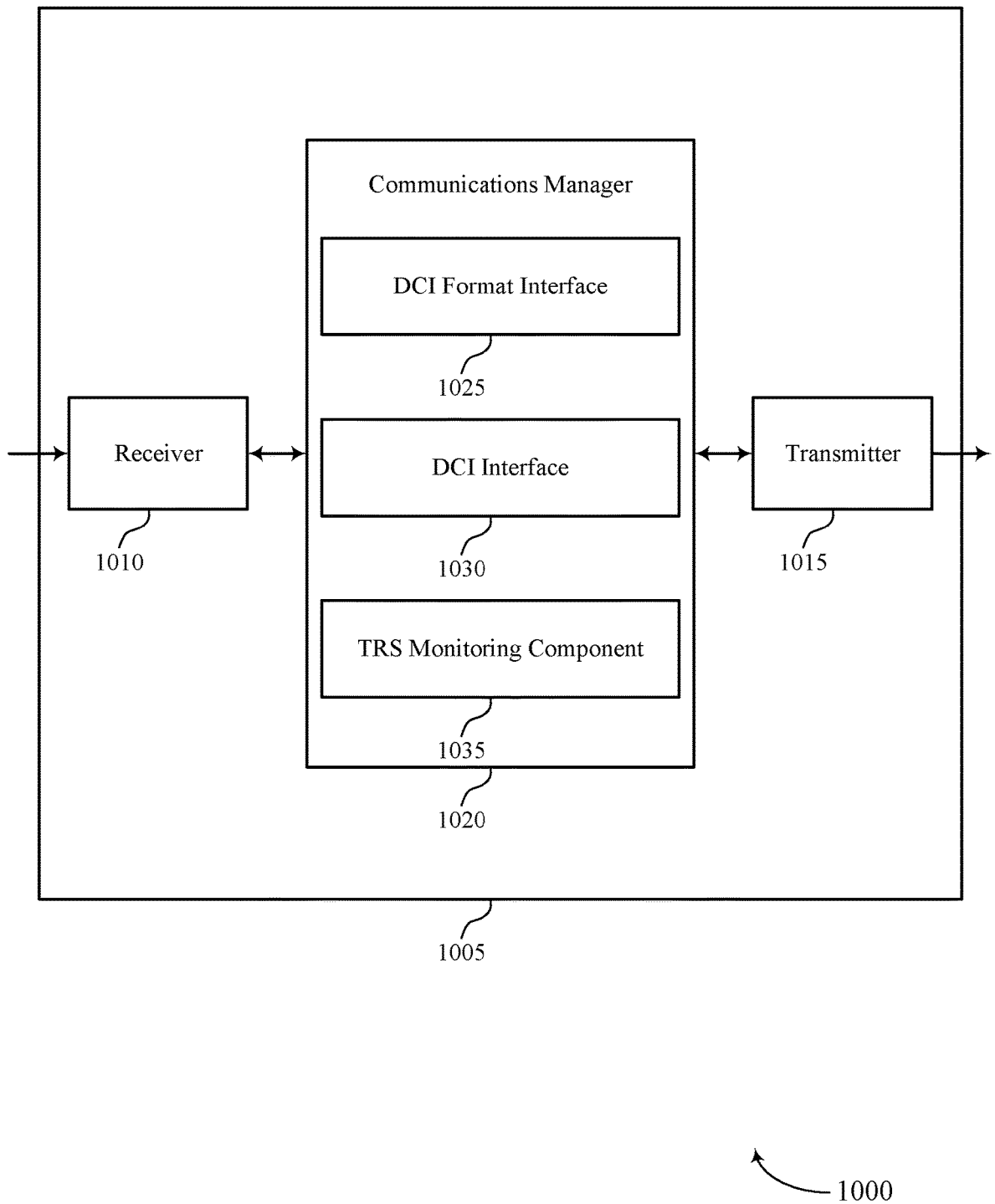

FIG. 10 shows a block diagram 1000 of a device 1005 that supports downlink transmit power control group common DCI in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to downlink transmit power control group common dci). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to downlink transmit power control group common dci). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of downlink transmit power control group common DCI as described herein. For example, the communications manager 1020 may include a DCI format interface 1025, a DCI interface 1030, an TRS monitoring component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The DCI format interface 1025 may be configured as or otherwise support a means for receiving control signaling that indicates a format for group common downlink control information associated with a set of multiple tracking reference signal resources for downlink power control and indicates a set of multiple downlink power control configurations. The DCI interface 1030 may be configured as or otherwise support a means for receiving the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The TRS monitoring component 1035 may be configured as or otherwise support a means for monitoring, during the one or more of the set of multiple tracking reference signal resources, for the one or more tracking reference signals in accordance with the one or more downlink power control configurations indicated via the group common downlink control information.

Figure 11:
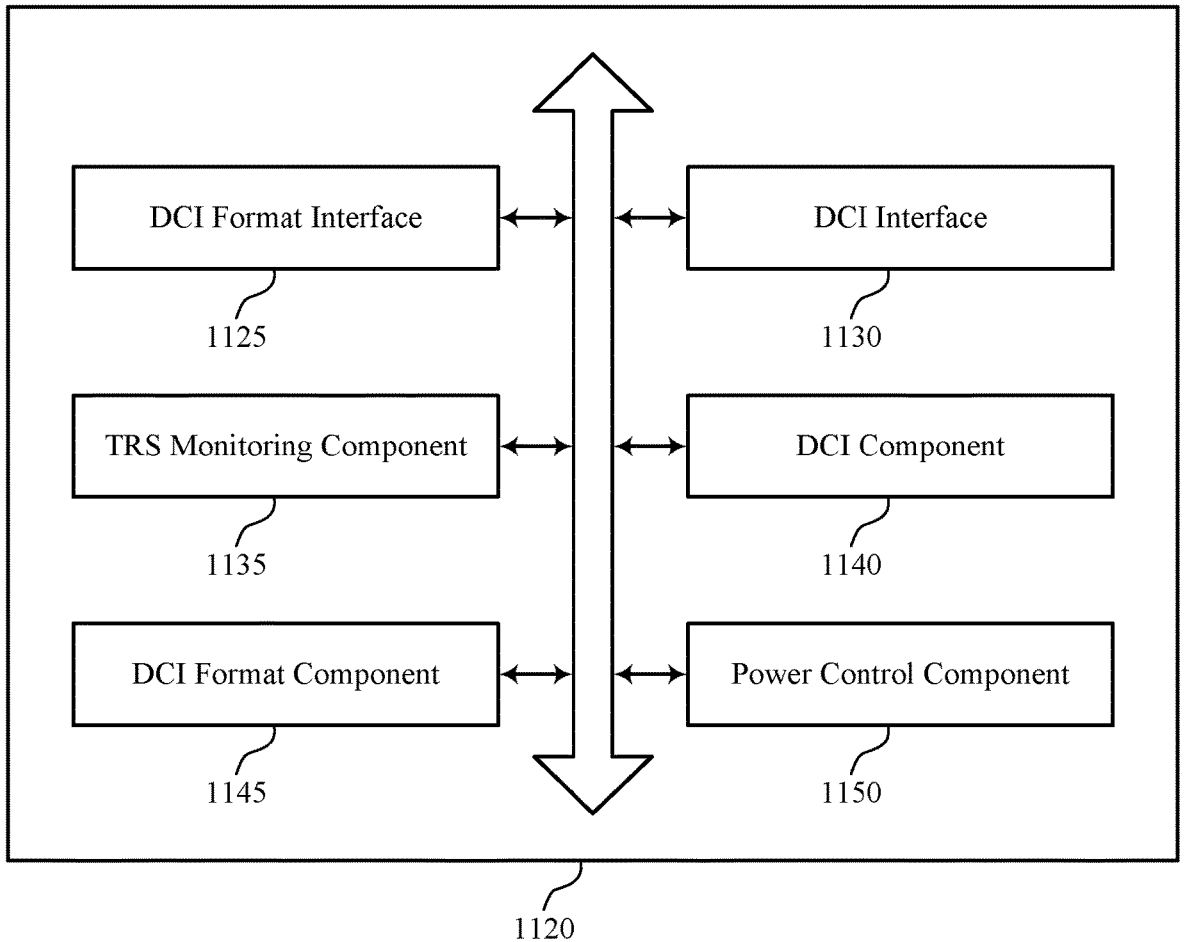
FIG. 11 shows a block diagram of a communications manager that supports downlink transmit power control group common DCI in accordance with one or more aspects of the present disclosure.

FIG. 11 shows a block diagram 1100 of a communications manager 1120 that supports downlink transmit power control group common DCI in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of downlink transmit power control group common DCI as described herein. For example, the communications manager 1120 may include a DCI format interface 1125, a DCI interface 1130, an TRS monitoring component 1135, a DCI component 1140, a DCI format component 1145, a power control component 1150, or any combination thereof. Each of these components may communicate, directly or indirectly, with one another (e.g., via one or more buses).

The communications manager 1120 may support wireless communication at a UE in accordance with examples as disclosed herein. The DCI format interface 1125 may be configured as or otherwise support a means for receiving control signaling that indicates a format for group common downlink control information associated with a set of multiple tracking reference signal resources for downlink power control and indicates a set of multiple downlink power control configurations. The DCI interface 1130 may be configured as or otherwise support a means for receiving the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The TRS monitoring component 1135 may be configured as or otherwise support a means for monitoring, during the one or more of the set of multiple tracking reference signal resources, for the one or more tracking reference signals in accordance with the one or more downlink power control configurations indicated via the group common downlink control information.

In some examples, the one or more downlink power control configurations indicated via the group common downlink control information received via the DCI interface 1130 indicate one or more power control values to be applied for monitoring for the one or more tracking reference signals. The one or more power control values may be identified via the DCI component 1140.

In some examples, the control signaling received via the DCI format interface 1125 maps sets of downlink power control configurations of the set of multiple downlink power control configurations to respective indexes. The mappings may be identified by the DCI format component 1145. In some examples, the group common downlink control information received via the DCI interface 1130 specifies an index that is mapped to the one or more downlink power control configurations via the control signaling. The index may be identified via the DCI component 1140.

In some examples, the one or more downlink power control configurations indicated via the group common downlink control information received by the DCI interface 1130 indicate one or more accumulation values. In some examples, monitoring, via the TRS monitoring component 1135, for the one or more tracking reference signals includes monitoring for the one or more tracking reference signals using one or more power control values that are based on the one or more accumulation values.

In some examples, the power control component 1150 may be configured as or otherwise support a means for the one or more power control values being based on the one or more accumulation values and one or more other power control values configured prior to receiving the group common downlink control information. The one or more power control values may be identified by the power control component 1150.

In some examples, the control signaling received via the DCI format interface 1125 maps sets of accumulation values corresponding to set of multiple downlink control configurations to respective indexes. In some examples, monitoring, via the TRS monitoring component 1135, for the one or more tracking reference signals includes monitoring for the one or more tracking reference signals using one or more power control values that are based on the one or more accumulation values mapped to an index specified in the group common downlink control information.

In some examples, the group common downlink control information received via the DCI interface 1130 indicates an identifier for one or more of the set of multiple tracking reference signal resources. The identifier may be identified by the TRS monitoring component 1135.

In some examples, monitoring, via the TRS monitoring component 1135, for the one or more tracking reference signals includes monitoring for the one or more tracking reference signals using the one or more downlink power control configurations during the set of multiple tracking reference signal resources.

In some examples, monitoring, via the TRS monitoring component 1135, for the one or more tracking reference signals includes monitoring for the one or more tracking reference signals using the one or more downlink power control configurations during a subset of the set of multiple tracking reference signal resources.

In some examples, the control signaling received via the DCI format interface 1125 maps subsets of the set of multiple tracking reference signal resources to respective tracking reference signal group identifiers.

In some examples, the group common downlink control information received via the DCI interface 1130 indicates an antenna configuration for a network entity. In some examples, the antenna configuration corresponds to the one or more downlink power control configurations.

In some examples, the control signaling received via the DCI format interface 1125 maps each set of downlink power control configurations of the set of multiple downlink power control configurations to respective antenna configurations.

In some examples, the control signaling received via the DCI format interface 1125 maps sets of downlink power control configurations of the set of multiple downlink power control configurations to respective power saving mode identifiers. In some examples, the group common downlink control information indicates a power saving mode identifier mapped to the one or more downlink power control configurations.

In some examples, the group common downlink control information received via the DCI interface 1130 indicates downlink power control configurations for a set of multiple UEs, tracking reference signal resource identifiers to use for applying the downlink power control configurations, or both.

In some examples, the format received via the DCI format interface 1125 indicates a location of the group common downlink control information, a length of the group common downlink control information, or both.

In some examples, the set of multiple downlink power control configurations that may be indicated via the group common downlink control information received via the DCI interface 1130 indicate power offset values, synchronization signal power offset values, or both.

Figure 12:
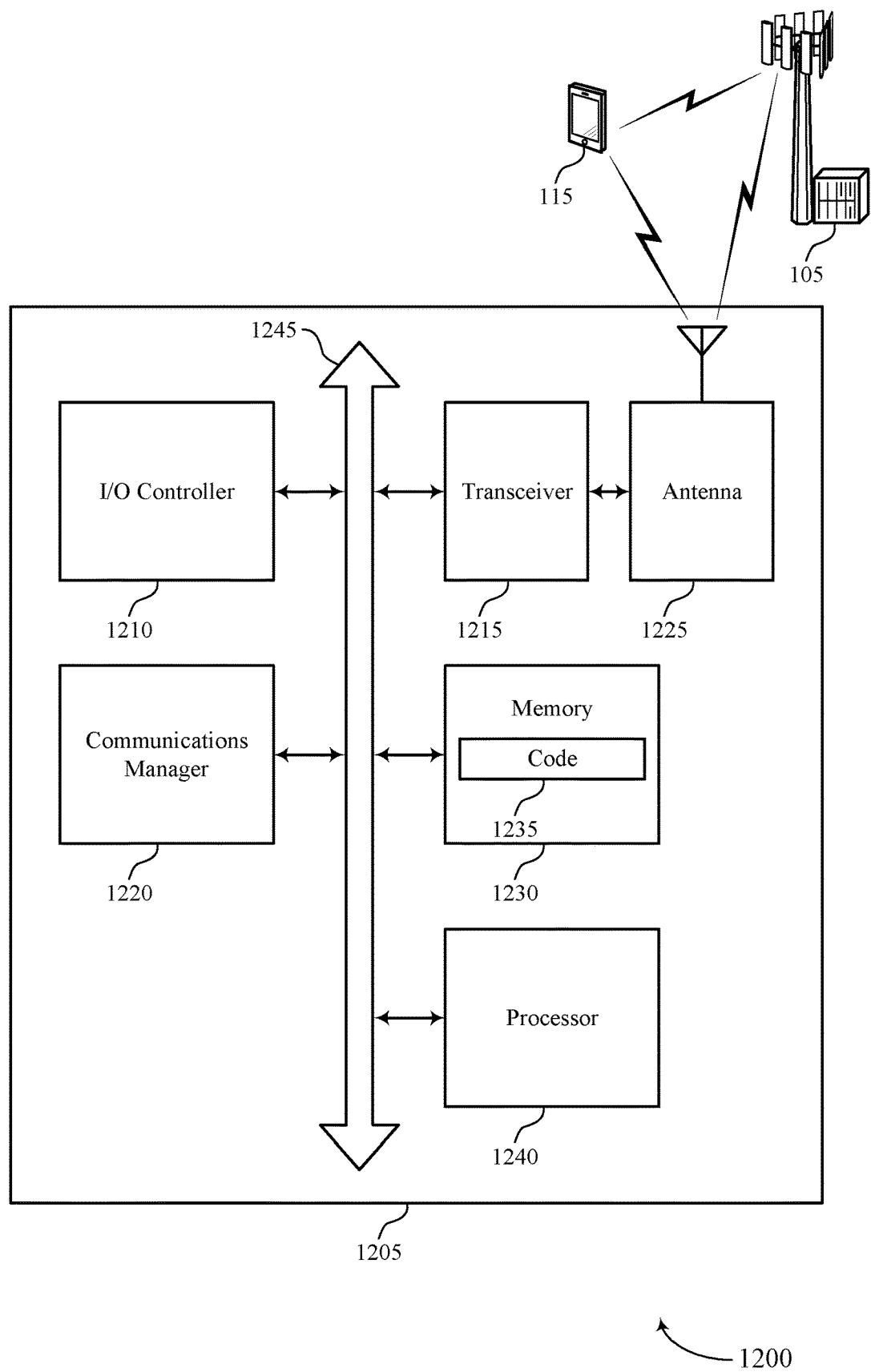
FIG. 12 shows a diagram of a system including a device that supports downlink transmit power control group common DCI in accordance with one or more aspects of the present disclosure.

FIG. 12 shows a diagram of a system 1200 including a device 1205 that supports downlink transmit power control group common DCI in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting downlink transmit power control group common dci). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving control signaling that indicates a format for group common downlink control information associated with a set of multiple tracking reference signal resources for downlink power control and indicates a set of multiple downlink power control configurations. The communications manager 1220 may be configured as or otherwise support a means for receiving the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The communications manager 1220 may be configured as or otherwise support a means for monitoring, during the one or more of the set of multiple tracking reference signal resources, for the one or more tracking reference signals in accordance with the one or more downlink power control configurations indicated via the group common downlink control information.

By including or configuring the communications manager 1220 in accordance with examples as described herein, the device 1205 may support techniques for reduced power consumption by using group common DCI signaling to support downlink power control adaptation.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of downlink transmit power control group common DCI as described herein, or the processor 1240 and the memory 1230 may be otherwise configured to perform or support such operations.

Figure 13:
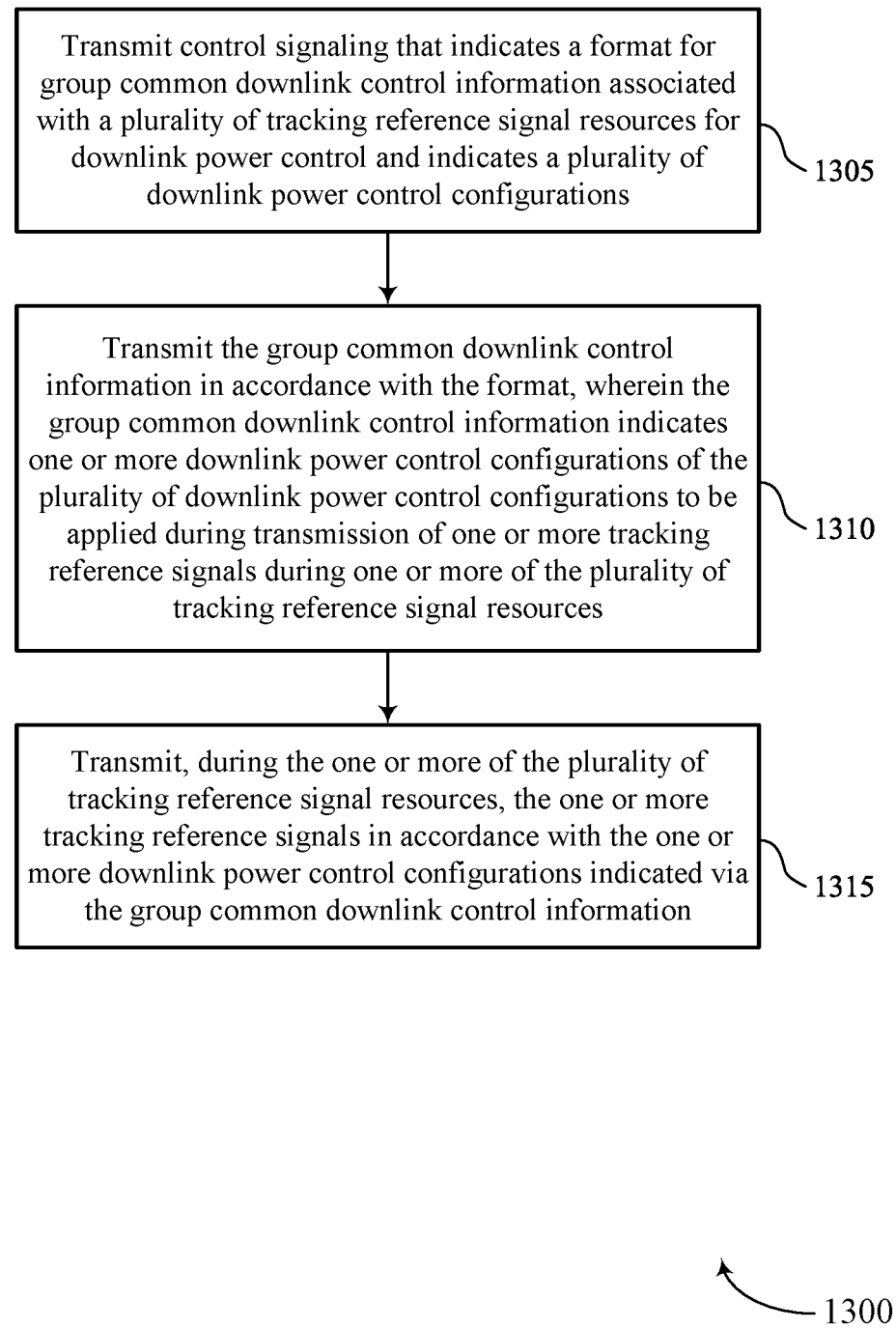
FIGS. 13 and 14 show flowcharts illustrating methods that support downlink transmit power control group common DCI in accordance with one or more aspects of the present disclosure.

FIG. 13 shows a flowchart illustrating a method 1300 that supports downlink transmit power control group common DCI in accordance with one or more aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include transmitting control signaling that indicates a format for group common downlink control information associated with a set of multiple tracking reference signal resources for downlink power control and indicates a set of multiple downlink power control configurations. The operations of 1305 may be performed in accordance with examples as disclosed herein. In some examples, aspects of the operations of 1305 may be performed by a DCI format interface 725 as described with reference to FIG. 7.

At 1310, the method may include transmitting the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The operations of 1310 may be performed in accordance with examples as disclosed herein. In some examples, aspects of the operations of 1310 may be performed by a DCI interface 730 as described with reference to FIG. 7.

At 1315, the method may include transmitting, during the one or more of the set of multiple tracking reference signal resources, the one or more tracking reference signals in accordance with the one or more downlink power control configurations indicated via the group common downlink control information. The operations of 1315 may be performed in accordance with examples as disclosed herein. In some examples, aspects of the operations of 1315 may be performed by an TRS interface 735 as described with reference to FIG. 7.

Figure 14:
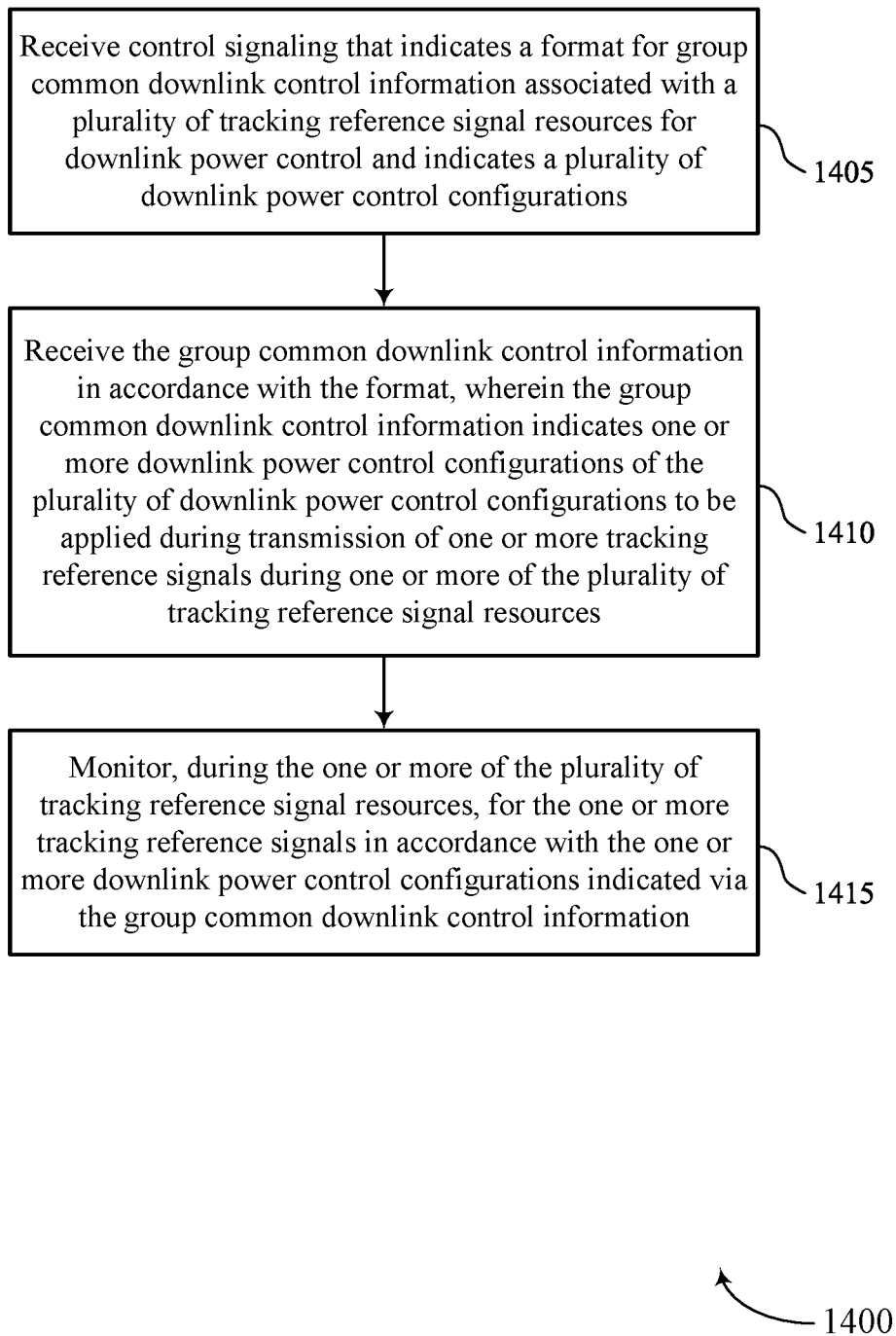

FIG. 14 shows a flowchart illustrating a method 1400 that supports downlink transmit power control group common DCI in accordance with one or more aspects of the present disclosure. The operations of the method 1400 may be implemented by a UE or its components as described herein. For example, the operations of the method 1400 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1405, the method may include receiving control signaling that indicates a format for group common downlink control information associated with a set of multiple tracking reference signal resources for downlink power control and indicates a set of multiple downlink power control configurations. The operations of 1405 may be performed in accordance with examples as disclosed herein. In some examples, aspects of the operations of 1405 may be performed by a DCI format interface 1125 as described with reference to FIG. 11.

At 1410, the method may include receiving the group common downlink control information in accordance with the format, where the group common downlink control information indicates one or more downlink power control configurations of the set of multiple downlink power control configurations to be applied during transmission of one or more tracking reference signals during one or more of the set of multiple tracking reference signal resources. The operations of 1410 may be performed in accordance with examples as disclosed herein. In some examples, aspects of the operations of 1410 may be performed by a DCI interface 1130 as described with reference to FIG. 11.

At 1415, the method may include monitoring, during the one or more of the set of multiple tracking reference signal resources, for the one or more tracking reference signals in accordance with the one or more downlink power control configurations indicated via the group common downlink control information. The operations of 1415 may be performed in accordance with examples as disclosed herein. In some examples, aspects of the operations of 1415 may be performed by an TRS monitoring component 1135 as described with reference to FIG. 11.

The following provides an overview of aspects of the present disclosure:

Aspect 1: A method for wireless communication at a network entity, comprising: transmitting control signaling that indicates a format for group common downlink control information associated with a plurality of tracking reference signal resources for downlink power control and indicates a plurality of downlink power control configurations; transmitting the group common downlink control information in accordance with the format, wherein the group common downlink control information indicates one or more downlink power control configurations of the plurality of downlink power control configurations to be applied during transmission of one or more tracking reference signals during one or more of the plurality of tracking reference signal resources; and transmitting, during the one or more of the plurality of tracking reference signal resources, the one or more tracking reference signals in accordance with the one or more downlink power control configurations indicated via the group common downlink control information.

Aspect 2: The method of aspect 1, wherein the one or more downlink power control configurations indicated via the group common downlink control information indicate one or more power control values to be applied for monitoring for the one or more tracking reference signals.

Aspect 3: The method of any of aspects 1 through 2, wherein the control signaling maps sets of downlink power control configurations of the plurality of downlink power control configurations to respective indexes; and the group common downlink control information indicates an index that is mapped to the one or more downlink power control configurations via the control signaling.

Aspect 4: The method of any of aspects 1 through 3, wherein the one or more downlink power control configurations indicated via the group common downlink control information indicate one or more accumulation values.

Aspect 5: The method of any of aspects 1 through 4, wherein the control signaling maps sets of accumulation values corresponding to plurality of downlink control configurations to respective indexes; and the group common downlink control information indicates an index that is mapped to one or more accumulation values.

Aspect 6: The method of any of aspects 1 through 5, wherein the group common downlink control information indicates an identifier for one or more of the plurality of tracking reference signal resources.

Aspect 7: The method of any of aspects 1 through 6, further comprising: the one or more tracking reference signals are transmitted according to the one or more downlink power control configurations and using the plurality of tracking reference signal resources.

Aspect 8: The method of any of aspects 1 through 7, further comprising: the one or more tracking reference signals are transmitted according to the one or more downlink power control configurations and using a subset of the plurality of tracking reference signal resources.

Aspect 9: The method of any of aspects 1 through 8, wherein the control signaling maps subsets of the plurality of tracking reference signal resources to respective tracking reference signal group identifiers.

Aspect 10: The method of any of aspects 1 through 9, wherein the group common downlink control information indicates an antenna configuration for a network entity; and the antenna configuration corresponds to the one or more downlink power control configurations.

Aspect 11: The method of any of aspects 1 through 8, wherein the control signaling maps sets of downlink power control configurations of the plurality of downlink power control configurations to respective antenna configurations.

Aspect 12: The method of any of aspects 1 through 8, wherein the control signaling maps sets of downlink power control configurations of the plurality of downlink power control configurations to respective power saving mode identifiers; and the group common downlink control information indicates a power saving mode identifier mapped to the one or more downlink power control configurations.

Aspect 13: The method of any of aspects 1 through 12, wherein the group common downlink control information indicates downlink power control configurations for a plurality of UEs, tracking reference signal resource identifiers to use for applying the downlink power control configurations, or both.

Aspect 14: The method of any of aspects 1 through 13, wherein the configuration indicates a location of the group common downlink control information, a length of the group common downlink control information, or both.

Aspect 15: The method of any of aspects 1 through 14, wherein the plurality of downlink power control configurations indicate power offset values, synchronization signal power offset values, or both.

Aspect 16: A method for wireless communication at a UE, comprising: receiving control signaling that indicates a format for group common downlink control information associated with a plurality of tracking reference signal resources for downlink power control and indicates a plurality of downlink power control configurations; receiving the group common downlink control information in accordance with the format, wherein the group common downlink control information indicates one or more downlink power control configurations of the plurality of downlink power control configurations to be applied during transmission of one or more tracking reference signals during one or more of the plurality of tracking reference signal resources; and monitoring, during the one or more of the plurality of tracking reference signal resources, for the one or more tracking reference signals in accordance with the one or more downlink power control configurations indicated via the group common downlink control information.

Aspect 17: The method of aspect 16, wherein the one or more downlink power control configurations indicated via the group common downlink control information indicate one or more power control values to be applied for monitoring for the one or more tracking reference signals.

Aspect 18: The method of any of aspects 16 through 17, wherein the control signaling maps sets of downlink power control configurations of the plurality of downlink power control configurations to respective indexes; and the group common downlink control information specifies an index that is mapped to the one or more downlink power control configurations via the control signaling.

Aspect 19: The method of any of aspects 16 through 18, wherein the one or more downlink power control configurations indicated via the group common downlink control information indicate one or more accumulation values; and wherein monitoring for the one or more tracking reference signals includes monitoring for the one or more tracking reference signals using one or more power control values that are based at least in part on the one or more accumulation values.

Aspect 20: The method of aspect 19, wherein the one or more power control values are based at least in part on the one or more accumulation values and one or more other power control values configured prior to receiving the group common downlink control information.

Aspect 21: The method of any of aspects 16 through 20, wherein the control signaling maps sets of accumulation values corresponding to plurality of downlink control configurations to respective indexes; and wherein monitoring for the one or more tracking reference signals includes monitoring for the one or more tracking reference signals using one or more power control values that are based at least in part on the one or more accumulation values mapped to an index specified in the group common downlink control information.

Aspect 22: The method of any of aspects 16 through 21, wherein the group common downlink control information indicates an identifier for one or more of the plurality of tracking reference signal resources.

Aspect 23: The method of any of aspects 16 through 22, wherein monitoring for the one or more tracking reference signals includes monitoring for the one or more tracking reference signals using the one or more downlink power control configurations during the plurality of tracking reference signal resources.

Aspect 24: The method of any of aspects 16 through 23, wherein monitoring for the one or more tracking reference signals includes monitoring for the one or more tracking reference signals using the one or more downlink power control configurations during a subset of the plurality of tracking reference signal resources.

Aspect 25: The method of any of aspects 16 through 24, wherein the control signaling maps subsets of the plurality of tracking reference signal resources to respective tracking reference signal group identifiers.

Aspect 26: The method of any of aspects 16 through 25, wherein the group common downlink control information indicates an antenna configuration for a network entity; and the antenna configuration corresponds to the one or more downlink power control configurations.

Aspect 27: The method of any of aspects 16 through 26, wherein the control signaling maps each set of downlink power control configurations of the plurality of downlink power control configurations to respective antenna configurations.

Aspect 28: The method of any of aspects 16 through 25, wherein the control signaling maps sets of downlink power control configurations of the plurality of downlink power control configurations to respective power saving mode identifiers; and the group common downlink control information indicates a power saving mode identifier mapped to the one or more downlink power control configurations.

Aspect 29: The method of any of aspects 16 through 28, wherein the group common downlink control information indicates downlink power control configurations for a plurality of UEs, tracking reference signal resource identifiers to use for applying the downlink power control configurations, or both.

Aspect 30: The method of any of aspects 16 through 29, wherein the configuration indicates a location of the group common downlink control information, a length of the group common downlink control information, or both.

Aspect 31: The method of any of aspects 16 through 30, wherein the plurality of downlink power control configurations indicate power offset values, synchronization signal power offset values, or both.

Aspect 32: An apparatus for wireless communication at a network entity, comprising a processor; memory coupled with the processor; and instructions stored in the memory and executable by the processor to cause the apparatus to perform a method of any of aspects 1 through 15.

Aspect 33: An apparatus for wireless communication at a network entity, comprising at least one means for performing a method of any of aspects 1 through 15.

Aspect 34: A non-transitory computer-readable medium storing code for wireless communication at a network entity, the code comprising instructions executable by a processor to perform a method of any of aspects 1 through 15.

Aspect 35: An apparatus for wireless communication at a UE, comprising a processor; memory coupled with the processor; and instructions stored in the memory and executable by the processor to cause the apparatus to perform a method of any of aspects 16 through 31.

Aspect 36: An apparatus for wireless communication at a UE, comprising at least one means for performing a method of any of aspects 16 through 31.

Aspect 37: A non-transitory computer-readable medium storing code for wireless communication at a UE, the code comprising instructions executable by a processor to perform a method of any of aspects 16 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a network entity, comprising:
   one or more processors;
   memory coupled with the one or more processors; and
   instructions stored in the memory and executable by the
      one or more processors to cause the apparatus to:

transmit control signaling that indicates a format for group common downlink control information associated with a plurality of tracking reference signal resources for downlink power control and indicates a plurality of downlink power control configurations;

transmit the group common downlink control information in accordance with the format, wherein the group common downlink control information indicates one or more downlink power control configurations of the plurality of downlink power control configurations to be applied during transmission of one or more tracking reference signals during one or more of the plurality of tracking reference signal resources; and transmit, during the one or more of the plurality of tracking reference signal resources, the one or more tracking reference signals in accordance with the one or more downlink power control configurations indicated via the group common downlink control information.

2. The apparatus of claim 1, wherein the one or more downlink power control configurations indicated via the group common downlink control information indicate one or more power control values to be applied for monitoring for the one or more tracking reference signals.

3. The apparatus of claim 1, wherein:
the control signaling maps sets of downlink power control configurations of the plurality of downlink power control configurations to respective indexes; and
the group common downlink control information indicates an index that is mapped to the one or more downlink power control configurations via the control signaling.

4. The apparatus of claim 1, wherein the one or more downlink power control configurations indicated via the group common downlink control information indicate one or more accumulation values.

5. The apparatus of claim 1, wherein:
the control signaling maps sets of accumulation values corresponding to plurality of downlink control configurations to respective indexes; and
the group common downlink control information indicates an index that is mapped to one or more accumulation values.

6. The apparatus of claim 1, wherein the group common downlink control information indicates an identifier for one or more of the plurality of tracking reference signal resources.

7. The apparatus of claim 1, wherein the one or more tracking reference signals are transmitted according to the one or more downlink power control configurations and using the plurality of tracking reference signal resources.

8. The apparatus of claim 1, wherein the one or more tracking reference signals are transmitted according to the one or more downlink power control configurations and using a subset of the plurality of tracking reference signal resources.

9. The apparatus of claim 1, wherein the control signaling maps subsets of the plurality of tracking reference signal resources to respective tracking reference signal group identifiers.

10. The apparatus of claim 1, wherein:
the group common downlink control information indicates an antenna configuration for a network entity; and
the antenna configuration corresponds to the one or more downlink power control configurations.

11. The apparatus of claim 1, wherein the control signaling maps sets of downlink power control configurations of the plurality of downlink power control configurations to respective antenna configurations.

12. The apparatus of claim 1, wherein:
the control signaling maps sets of downlink power control configurations of the plurality of downlink power control configurations to respective power saving mode identifiers; and
the group common downlink control information indicates a power saving mode identifier mapped to the one or more downlink power control configurations.

13. The apparatus of claim 1, wherein the group common downlink control information indicates downlink power control configurations for a plurality of UEs, tracking reference signal resource identifiers to use for applying the downlink power control configurations, or both.

14. The apparatus of claim 1, wherein the format indicates a location of the group common downlink control information, a length of the group common downlink control information, or both.

15. The apparatus of claim 1, wherein the plurality of downlink power control configurations indicate power offset values, synchronization signal power offset values, or both.

16. An apparatus for wireless communication at a user equipment (UE), comprising:
one or more processors;
memory coupled with the one or more processors; and
instructions stored in the memory and executable by the one or more processors to cause the apparatus to:
receive control signaling that indicates a format for group common downlink control information associated with a plurality of tracking reference signal resources for downlink power control and indicates a plurality of downlink power control configurations;
receive the group common downlink control information in accordance with the format, wherein the group common downlink control information indicates one or more downlink power control configurations of the plurality of downlink power control configurations to be applied during transmission of one or more tracking reference signals during one or more of the plurality of tracking reference signal resources; and
monitor, during the one or more of the plurality of tracking reference signal resources, for the one or more tracking reference signals in accordance with the one or more downlink power control configurations indicated via the group common downlink control information.

17. The apparatus of claim 16, wherein the one or more downlink power control configurations indicated via the group common downlink control information indicate one or more power control values to be applied for monitoring for the one or more tracking reference signals.

18. The apparatus of claim 16, wherein:
the control signaling maps sets of downlink power control configurations of the plurality of downlink power control configurations to respective indexes; and
the group common downlink control information specifies an index that is mapped to the one or more downlink power control configurations via the control signaling.

19. The apparatus of claim 16, wherein the one or more downlink power control configurations indicated via the group common downlink control information indicate one or more accumulation values, and wherein monitoring for the one or more tracking reference signals includes monitoring for the one or more tracking reference signals using one or more power control values that are based at least in part on the one or more accumulation values.

20. The apparatus of claim 19, wherein the one or more power control values are based at least in part on the one or more accumulation values and one or more other power control values configured prior to receiving the group common downlink control information.

21. The apparatus of claim 16, wherein the control signaling maps sets of accumulation values corresponding to plurality of downlink control configurations to respective indexes, and
wherein monitoring for the one or more tracking reference signals includes monitoring for the one or more tracking reference signals using one or more power control values that are based at least in part on one or more accumulation values mapped to an index specified in the group common downlink control information.

22. The apparatus of claim 16, wherein the group common downlink control information indicates an identifier for one or more of the plurality of tracking reference signal resources.

23. The apparatus of claim 16, wherein monitoring for the one or more tracking reference signals includes monitoring for the one or more tracking reference signals using the one or more downlink power control configurations during the plurality of tracking reference signal resources.

24. The apparatus of claim 16, wherein monitoring for the one or more tracking reference signals includes monitoring for the one or more tracking reference signals using the one or more downlink power control configurations during a subset of the plurality of tracking reference signal resources.

25. The apparatus of claim 16, wherein the control signaling maps subsets of the plurality of tracking reference signal resources to respective tracking reference signal group identifiers.

26. The apparatus of claim 16, wherein:
the group common downlink control information indicates an antenna configuration for a network entity; and
the antenna configuration corresponds to the one or more downlink power control configurations.

27. The apparatus of claim 16, wherein the control signaling maps each set of downlink power control configurations of the plurality of downlink power control configurations to respective antenna configurations.

28. The apparatus of claim 16, wherein:
the control signaling maps sets of downlink power control configurations of the plurality of downlink power control configurations to respective power saving mode identifiers; and
the group common downlink control information indicates a power saving mode identifier mapped to the one or more downlink power control configurations.

29. A method for wireless communication at a network entity, comprising:
transmitting control signaling that indicates a format for group common downlink control information associated with a plurality of tracking reference signal resources for downlink power control and indicates a plurality of downlink power control configurations;
transmitting the group common downlink control information in accordance with the format, wherein the group common downlink control information indicates one or more downlink power control configurations of the plurality of downlink power control configurations to be applied during transmission of one or more tracking reference signals during one or more of the plurality of tracking reference signal resources; and
transmitting, during the one or more of the plurality of tracking reference signal resources, the one or more tracking reference signals in accordance with the one or more downlink power control configurations indicated via the group common downlink control information.

30. A method for wireless communication at a user equipment (UE), comprising:
receiving control signaling that indicates a format for group common downlink control information associated with a plurality of tracking reference signal resources for downlink power control and indicates a plurality of downlink power control configurations;
receiving the group common downlink control information in accordance with the format, wherein the group common downlink control information indicates one or more downlink power control configurations of the plurality of downlink power control configurations to be applied during transmission of one or more tracking reference signals during one or more of the plurality of tracking reference signal resources; and
monitoring, during the one or more of the plurality of tracking reference signal resources, for the one or more tracking reference signals in accordance with the one or more downlink power control configurations indicated via the group common downlink control information.

* * * * *